United States Patent [19]

Torikoshi et al.

[11] Patent Number: 5,325,140
[45] Date of Patent: Jun. 28, 1994

[54] CAMERA

[75] Inventors: Yuichi Torikoshi, Shiroyama; Goichi Hiratsuka, Sagamihara; Hideki Okubo, Komae; Takashi Suzuki; Hideaki Kume, both of Hachioji, all of Japan

[73] Assignee: Olympus Optical Co., Ltd., Tokyo, Japan

[21] Appl. No.: 814,414

[22] Filed: Dec. 23, 1991

[30] Foreign Application Priority Data

Dec. 28, 1990 [JP] Japan .................................. 2-409061
Dec. 28, 1990 [JP] Japan .................................. 2-409234
Jan. 7, 1991 [JP] Japan .................................. 3-000155

[51] Int. Cl.[5] ................................................ G03B 17/02
[52] U.S. Cl. ................................ 354/159; 354/222; 354/219
[58] Field of Search ................... 354/222, 219, 159; 352/79

[56] References Cited

U.S. PATENT DOCUMENTS

| 4,716,427 | 12/1987 | Shyu | 354/222 |
| 4,945,372 | 7/1990 | Higuchi et al. | 354/222 |
| 4,965,615 | 10/1990 | Fujita et al. | 354/222 |
| 5,010,357 | 4/1991 | Misawa | 354/159 |
| 5,059,994 | 10/1991 | Harvey | 354/222 |

FOREIGN PATENT DOCUMENTS

| 35-25058 | 1/1960 | Japan . |
| 1-107240 | 4/1989 | Japan . |
| 1-207731 | 8/1989 | Japan . |

Primary Examiner—Monroe H. Hayes
Attorney, Agent, or Firm—Louis Weinstein

[57] ABSTRACT

A camera wherein the photographed picture size can be switched and is formed mostly of a magnification variable finder optical system, a photographed picture size switching mechanism and a finder visual field frame switching mechanism. When the picture size is switched by operating the photographed picture size switching mechanism, the finder magnification will be altered to a magnification corresponding to the picture size through a finder cam as operatively connected with the operation and at the same time the finder visual field frame will be also altered in conformity with the finder magnification and picture size. According to this camera, for example, even if the picture frame becomes narrow, the finder magnification will be elevated by switching the picture size and further the image will be made easy to observe by expanding the finder visual field frame.

33 Claims, 28 Drawing Sheets

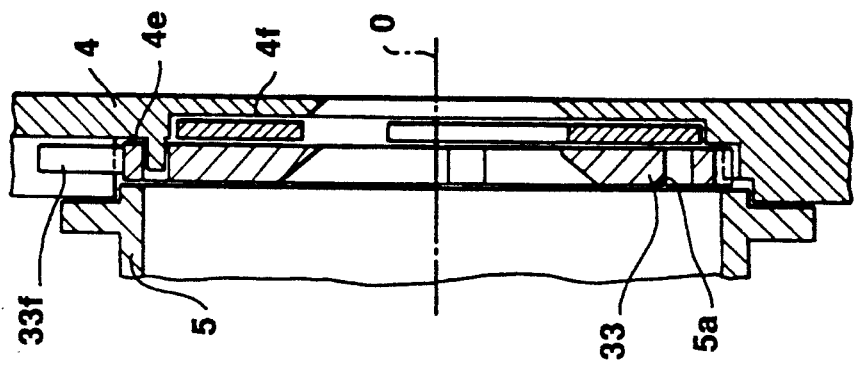
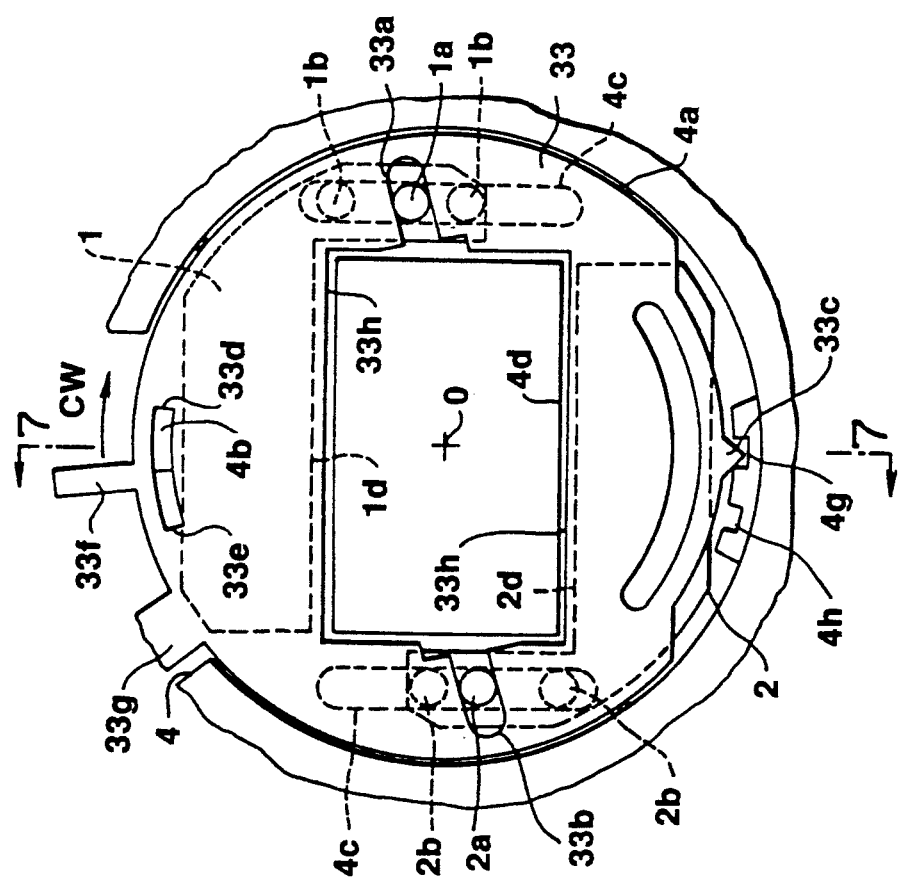

CAMERA

BACKGROUND OF THE INVENTION

1. Field of the Invention

This invention relates to cameras and more particularly to a magnification variable camera which has a photographed picture size switching mechanism so that the size of the photographed picture may be variable.

2. Related Art Statement

Recently the functions of cameras are multiple and switching a photographed picture size is one of them. Such switching of a photographed picture size relates to switching, for example, a normal size to a half size or to a panorama size. In such camera, the visual field of the finder must be switched as operatively connected with the switching of the photographed picture size. Numerous suggestions have been made on these switching mechanisms.

The disclosure in the publication, for example, of Japanese patent application laid open No. 207731/1989 relates to a technique of a zooming driving system of a photographing lens and a zooming driving system of a finder operatively connected with it. According to these systems, it is possible to operatively connect a finder visual field frame with the switching of the above mentioned photographed picture size by adding a photographed picture size switching mechanism.

However, in the disclosure in this publication, only the finder visual field frame is merely driven as operatively connected with the switching of the photographed picture size and the picture of the finder becomes so small as not to be desirable in use. FIG. 43 shows a finder visual field frame Fn at the time of the normal photographing with the camera, that is, at the time of photographing a normal size picture. FIG. 44 shows a finder visual field frame Fp1 showing that, when a photographed picture size is switched to a half size use, the finder visual field frame will be also switched as operatively connected. This visual field frame Fp1 is of a picture in which the finder magnification is not varied but is merely made narrow and therefore has a disadvantage that the observation with it is difficult.

The disclosure in the publication of another Japanese patent application laid open No. 107240/1989 relates to a means for switching a finder visual field and finder magnification at the time of trimming, that is, at the time of switching a photographed picture size. However, the means for switching the finder magnification is to switch the magnification of the finder eyepiece.

However, in the disclosure in this publication, when the photographed picture size is switched, simultaneously with switching the finder visual field, the magnification of the finder eyepiece will be made large. However, in order to enlarge the magnification of the finder eyepiece, the structure of the eyepiece will inevitably become complicated and large. Usually, such eyepiece is arranged in the upper part of the back surface of the camera. If this part becomes large, it will be disadvantageous in utilizing and carrying the camera. If the finder magnification is made extremely large, the strain and dust on the image forming surface of the finder will be observed as magnified, the precision in making the finder will have to be further improved. the dust will have to be more carefully prevented in assembling and therefore the problem of the high cost will be produced.

The photographing area converting apparatus in a camera disclosed in the publication of Japanese utility model application publication No. 25058/1960 relates to a full size and half size photographed picture switching mechanism switching by operatively connecting a real picture mask and finder mask by a manual operation.

In the apparatus disclosed in this publication, the size is switched by a manual operation and therefore can not be switched by one touch by the user and, in case the required operation amount of the operating member is large, a large operating member space will have to be provided in the outer appearance part of the camera body and there will be such disadvantage that a restriction will be produced to the design. Further, in the apparatus disclosed in the publication, when the picture size is switched from the full size to a half size, the finder visual field will be covered on both sides so as to be for a half size. In such case, the finder visual field will be so small as to be disadvantageous to finder observation.

In the camera aiming at a pseudo telescopic effect disclosed in U.S. Pat. No. 743,470, when the telescopy with the full size is exceeded, the real picture will be switched to a trimming mode and, at the same time, the finder will be elevated in the magnification with the visual field frame constant as it is to set it on the narrow telescopy side. However, in the disclosure in this publication, the zooming region of the finder system can be set as expanded to be larger than the zooming region of the photographing optical system and its effect can be developed only in the trimming region exceeding the telescopy limit of the photographing optical system. Therefore, there is no effect on setting the picture size within the zooming region of the photographing optical system.

OBJECTS AND SUMMARY OF THE INVENTION

An object of the present invention is to provide a camera wherein, in case the finder visual field is switched as operatively connected with switching the picture size, the magnification of the finder optical system or the magnification and visual field frame of the finder optical system will be also simultaneously switched, for example, the finder visual field will be varied as in the wide visual field frame Fp2 shown in FIG. 44 so that the finder observation may be easy. This camera is simpler to switch the picture size than the above mentioned prior art example and can be made smaller.

Another object of the present invention is to provide a camera wherein the magnifications of the picture size switching mechanism, visual field frame switching mechanism and finder optical system can be altered by a motor which is a driving source for a magnification varying driving mechanism so that the user may simultaneously switch by one touch operation the picture size, finder visual field and finder optical system magnification. This camera is easier to use, is less restricted in the design and can be applied to the recent two-focus type or zooming type.

A camera of the present invention comprises a magnification variable photographing optical system, a photographed picture size switching mechanism for switching the size of a photographed picture formed on a film surface by the photographing optical system, a finder optical system having an optical axis different from that of the above mentioned photographing optical system and having a magnification varying ratio larger than that of the above mentioned photographing optical system and a finder cam altering the magnification of the above mentioned finder optical system by driving the finder optical system and is characterized in that the above mentioned finder cam is formed having a first region for altering the magnification of the above mentioned finder optical system in response to the magnification varying operation of the photographing optical system at the time of the normal photographing and a second region connected to the first region and altering the magnification of the above mentioned finder optical system when the above mentioned photographed picture size switching mechanism is operated.

Another camera of the present invention comprises a picture size switching mechanism for altering the size of a photographed picture formed on a film surface by a photographing optical system, a finder optical system having a magnification ratio larger than of the photographing optical system and a visual field frame switching mechanism for altering the size of a finder visual field frame provided within the finder optical system and is characterized in that, in case the size of the photographed picture formed on the above mentioned film surface is altered, the above mentioned picture size switching mechanism and visual field frame switching mechanism will be operated as operatively connected and the magnification of the above mentioned finder optical system will be also altered.

Further another camera of the present invention comprises a magnification varying driving mechanism drivingly varying the magnification of the photographing optical system, a motor serving as a driving source of the magnification varying driving mechanism, a picture size switching mechanism for altering the size of a photographed picture formed on a film surface by the above mentioned photographing optical system, a finder optical system having a magnification varying ratio larger than of the above mentioned photographing optical system and a visual field frame switching mechanism altering the size of a finder visual field frame provided within the finder optical system and is characterized in that the above mentioned picture size switching mechanism and visual field frame switching mechanism are operated and the magnification of the above mentioned finder optical system is altered through the magnification varying driving mechanism with the above mentioned motor as a driving source.

The other features and advantages of the present invention will become apparent enough with the following description.

BRIEF DESCRIPTION OF THE DRAWINGS

FIG. 6 is an elevation of a picture size switching mechanism part in the N photographing mode in the camera in the above mentioned FIG. 1.

FIG. 7 is a sectioned view on line 7—7 in the above mentioned FIG. 6.

DETAILED DESCRIPTION OF THE PREFERRED EMBODIMENTS

The present invention shall be explained in the following on the basis of the illustrated embodiments.

Figure 1:
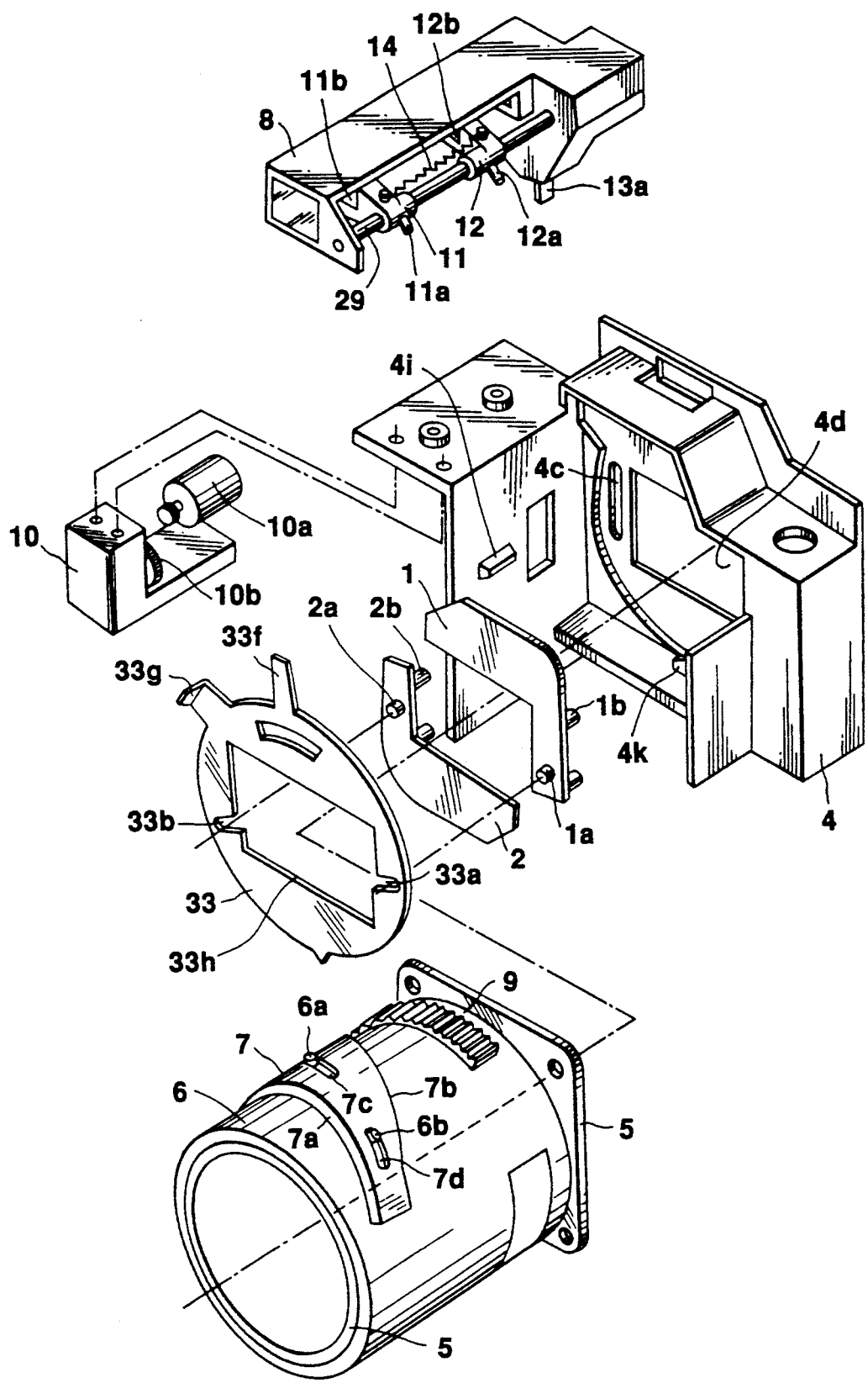
FIG. 1 is an exploded perspective view of a camera showing the first embodiment of the present invention.

First of all, the summary of the camera showing the first embodiment of the present invention shall be explained. FIG. 1 is an exploded .perspective of the camera of this embodiment. This camera is formed mostly of a camera body 4, a lens barrel part which is a magnification variable photographing optical system, a finder unit having a finder optical system and finder visual field frame switching mechanism, a zooming motor unit 10 and a photographed picture size switching mechanism part. By the way, the photographed picture size switching in the general camera is to switch a picture of the normal size (so called full size of 24 mm×36 mm and called the N size hereinafter) at the time of the normal photographing (called the N photographing hereinafter) mode to a picture of the half size at the time of the half size photographing or a picture of the panorama size (13 mm×36 mm and called the P size hereinafter) at the time of the panorama photographing (called the P photographing hereinafter) mode. In the case of this camera, a full size picture at the time of the N photographing can be switched to a panorama size picture at the time of the P photographing or vice versa.

The zooming motor unit 10 is supported by the body 4 and is formed of a zooming motor 10a and gear train 10b.

The lens barrel part is formed of a fixed frame 5, a cam ring 6 rotatably supported by the fixed frame 5 and a photographing lens not illustrated. On the outer periphery of the cam ring 6. a finder cam 7 having first and second regions are arranged rotatably in the peripheral direction as guided by pins 6a and 6b. A gear 9 meshing with the above mentioned gear train 10b is secured to the cam ring 6. By the way, the finder cam 7 is held to be switchable to two relative positions corresponding to the N photographing and P photographing modes with respect to the cam ring 6. The relative positions are switched by butting the cam 7 against stoppers 4i and 4k of the body 4 and displacing the holding positions.

The finder unit is formed of a finder body 8, a guide shaft 29 supported by the body 8, finder lens F, frames 11 and 12 slidably supported by the shaft 29, finder magnification varying lenses 11b and 12b held by the frames 11 and 12, a visual field mask operating switching lever 13, an F frame spring 14 hung on each other of the frames 11 and 12, a poro-prism not illustrated in FIG. 1, a visual field mask and an eyepiece. The finder body 8 is fitted to the camera body 4.

The photographed picture size switching mechanism part is arranged in the front surface part of a standard mask opening 4d of the camera body 4 and is formed of photographed picture size switching movable masks 1 and 2 and a P ring 33 operating these masks. By the way, the masks 1 and 2 can be moved to the respective picture size switching positions by respective guide pins 1b and 2b guided in a straight advancing guide groove 4c of the body 4.

When an operating arm 33f is operated, the above mentioned P ring 33 will move the above mentioned masks 1 and 2 to the respective picture size switching positions through the masks 1 and 2 driving pins 1a and 2a fitting in incisions 33a and 33b provided on the inner periphery. The P ring 33 is regulated in the rotating position by the body 4. This regulated position gives photographed picture sizes corresponding to the N photographing and P photographing of the masks 1 and 2.

The summary of the operation of this camera formed as in the above described embodiment shall e explained. First of all, the cam ring 6 is rotated by the zooming motor 10a on the basis of a zoom controlling signal to make a zooming operation of the camera. Also, on the basis of the zooming operation, the finder 11 and 12 of the finder unit are driven in the optical axial direction by the finder cam 7 to zoom the finder optical system. In switching the photographed picture size, in order to make an N photographing mode, the P ring 33 is rotated counter-clockwise (called CCW hereinafter) to vertically open the masks 1 and 2 to make an N size picture. In order to set a P photographing mode, the P ring 33 is rotated clockwise (called CW hereinafter) to move the masks 1 and 2 to approach each other to make a P size picture. A driving arm 33g presses an operating arm 13a of the visual field mask switching lever 13 of the above mentioned finder unit and gives a finder visual field frame corresponding to the above mentioned photographed picture size.

Figure 14:
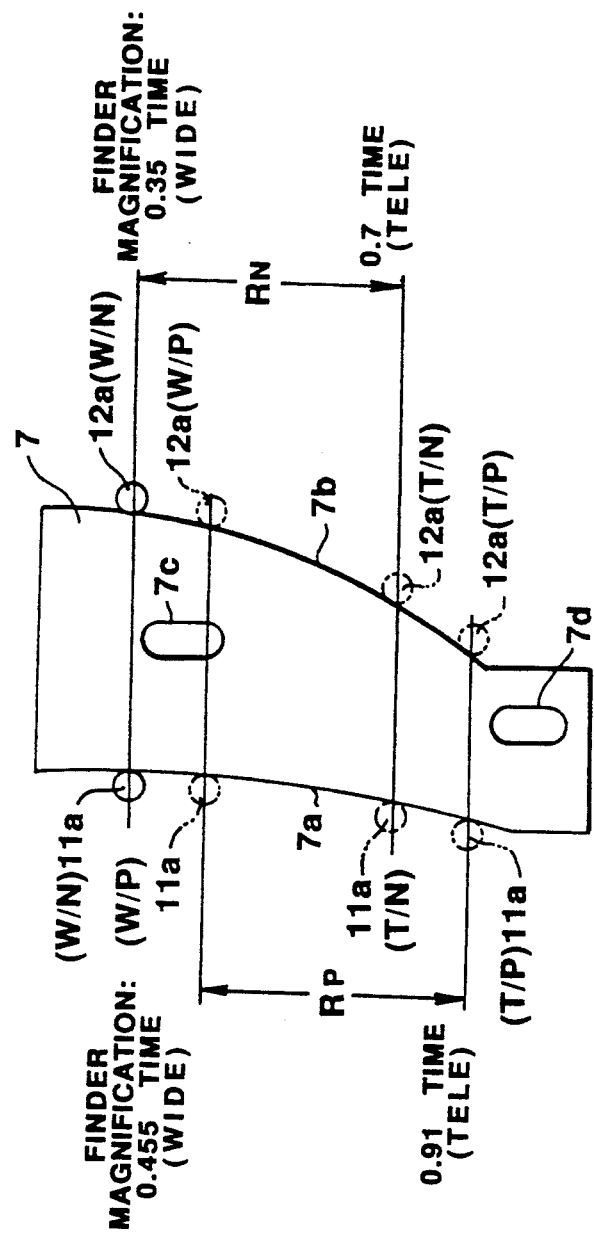
FIG. 14 is a developed view showing the relative position relation of a finder cam and cam pin in the N/P photographing mode of the camera in the above mentioned FIG. 1.

Also, the relative positions of the cam ring 6 and finder cam 7 are switched in response to the switching of the above mentioned photographed picture size. That is to say, the cam ring 6 is rotated CCW or CW, the finder cam 7 is butted against the stoppers 4i and 4k and the relative position with the cam ring 6 is set as displaced to the N photographing mode and P photographing mode positions. Therefore, the regions in which the cam pins 11a and 12a of the F frames 11 and 12 of the finder unit are in sliding contact with the cam surfaces 7a and 7b of the finder cam 7 will be different. Thus, at the time of the N photographing, the first region will be used and, at the time of the P photographing, the second region will be used. The first and second regions are formed as continued on the cam surfaces 7a and 7b (FIG. 14).

Figure 44:
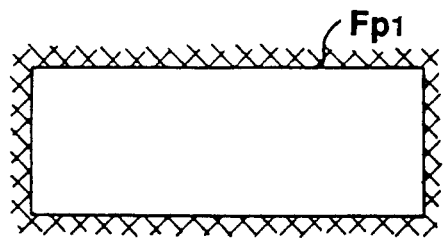
FIG. 44 is a view showing a visual field frame at the time of the panorama photographing of the camera of the related art.
Figure 45:
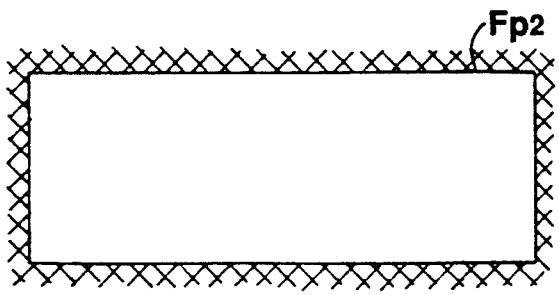
FIG. 45 is a view showing a visual field frame at the time of the panorama photographing of the camera of the present invention.

As in the above, in this camera, the finder visual field frame size is switched in response to the switching of the photographed picture size in the N photographing and P photographing, at the same time, the value of the magnification varying rate of the finder is altered and particularly, at the time of the P photographing, the magnification can be elevated to prevent the finder from becoming hard to see. For example, the finder visual field frame at the time of the P photographing will not be the visual field frame Fp1 as in the prior art example shown in FIG. 44 but will be the visual field frame Fp2 shown in FIG. 45.

Figure 2:
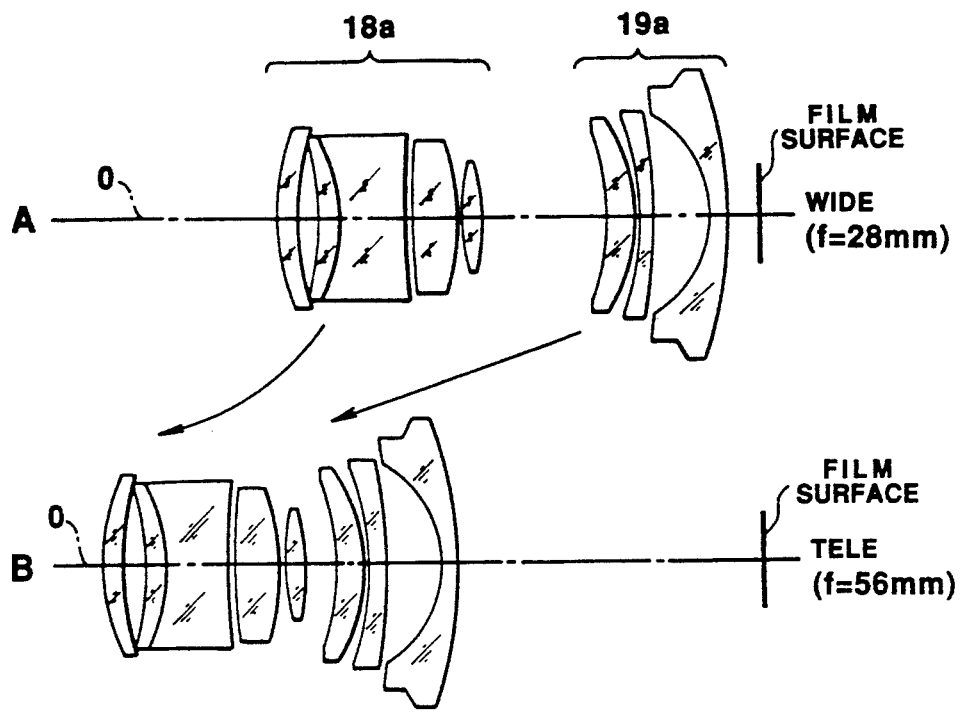
FIG. 2 is a view showing a zooming state of a photographing optical system of the camera in the above mentioned FIG. 1.
Figure 3:
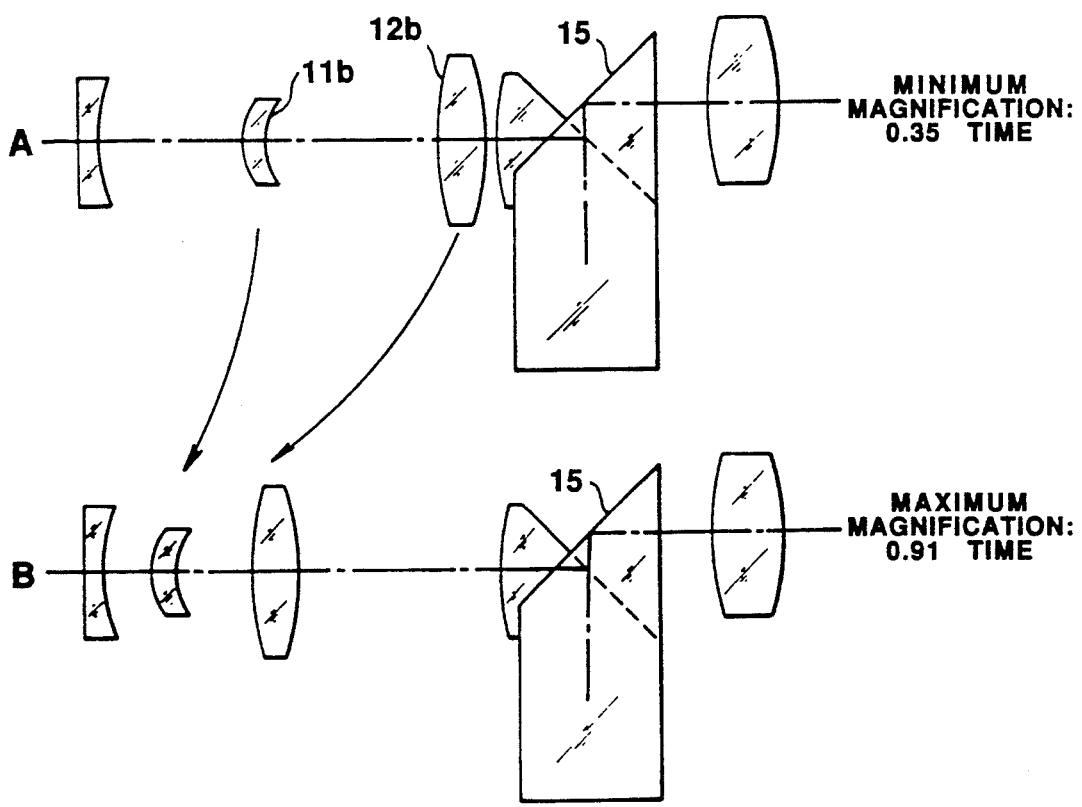
FIG. 3 is a view showing a zooming state of a finder optical system of the camera in the above mentioned FIG. 1.

FIGS. 2 and 3 show the zooming operation states of the above mentioned photographing lens and a finder magnification varying lens. FIG. 2 shows the paying out positions in the wide state (A) and tele state (B) of the first group lens 18a and second group lens 19a which are photographing lenses. The respective focal lengths f are 28 mm and 56 mm. The magnification varying rate is 2.

On the other hand, FIG. 3 shows a zooming state of a finder optical system and shows the paying out positions in the wide state (A) and tele state (B) of the finder magnification varying lenses 11b and 12b. The range of the magnification varying rate is made 0.35 to 0.91. Therefore, the total magnification varying rate will be 2.6. However, the range of the magnification variation corresponding to the finder cam first region for the N photographing is 0.35 to 0.7 and the range of the magnification variation corresponding to the second region for the P photographing is 0.455 to 0.91. Therefore, simultaneously with the rise of the finder magnification, the visual field frame at the time of the P photographing will have to be expanded as in the visual field frame Fp2 shown in FIG. 45.

The main formation of the above mentioned lens barrel shall be explained in the following with reference to FIG. 4.

Figure 4:
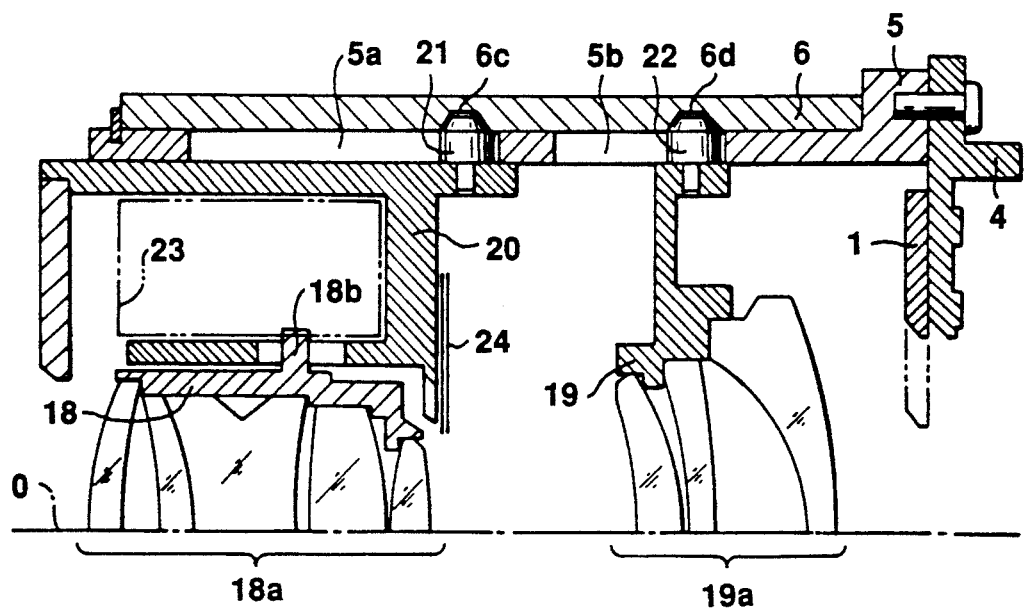
FIG. 4 is a longitudinally sectioned view of an essential part of a photographing lens barrel of the camera in the above mentioned FIG. 1.

This lens barrel is a zoom lens barrel of a focal length of 28 to 56 ram, is formed of two groups of lenses and is formed as shown in FIG. 4 of a moving frame 20 slidably fitted within the fixed frame 5, a first group frame 18 holding a first group lens 18a supported by the moving frame 20 and a second group frame 19 holding a second group lens 19a. The frames 18 and 19 are moved in the direction of the optical axis 0 by driving the cam pins 21 and 22 secured to the moving frame 20 and the frame 18 with the cams 6c and 6d of the rotating cam ring 6. By the way, the cam pins 21 and 22 are guided in the optical axial direction 0 by straight advancing grooves 5a and 5b in the fixed frame 5.

A shutter blade 24 is operated by a shutter focusing mechanism part 23 provided within the moving frame 20. At the same time, the first group lens 18 is driven to be focused through a driving pin 18b of the first group frame 18.

The formation of the optical system of the above mentioned finder unit shall be explained in the following with reference to FIG. 5.

Figure 5:
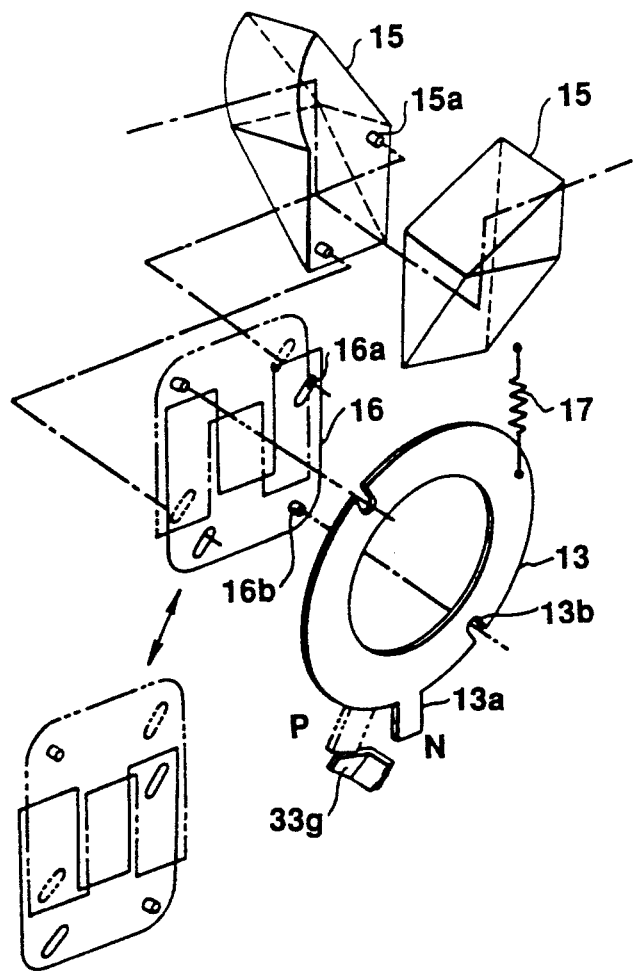
FIG. 5 is an exploded perspective view of an essential part of a finder optical system of the camera in the above mentioned FIG. 1.

As shown in FIG. 5, a porro-prism 15 having four reflecting surfaces is separated into two bodies on the right and left and the image forming surface of the finder image forming system is positioned intermediately between them. The finder visual field mask 16 is formed of two sheets and slot parts 16a engage with projections 15a of the porro-prism 15 and are slidably held. Also, a visual field switching lever 13 is rotatably held in the finder body 8 (FIG. 1) and is energized in the CCW direction by a visual field spring 17. When the P ring 33 shown in FIG. 1 is rotated in the CW direction by the P photographing switching operation, the driving arm 33g of the P ring 33 will press the arm part 13a of the visual field switching lever 13 and will rotate the visual field switching lever 13 in the CW direction against the visual field spring 17. At this time, the U groove 13b of the visual field frame switching lever 13 will engage with the projection 16b of the visual field mask 16, therefore the visual field mask 16 will move in the lengthwise direction of the slot 16a and the visual field frame size will be switched.

The picture size switching mechanism of this camera shall be explained in detail in the following with reference to FIGS. 6 to 9.

Figure 9:
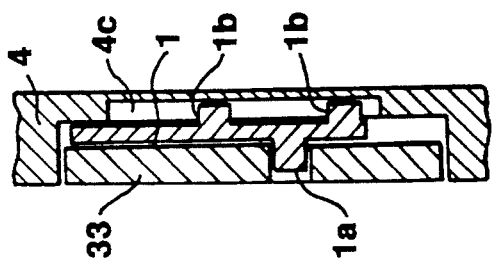
FIG. 9 is a sectioned view on line 9—9 in the above mentioned FIG. 8.
Figure 8:
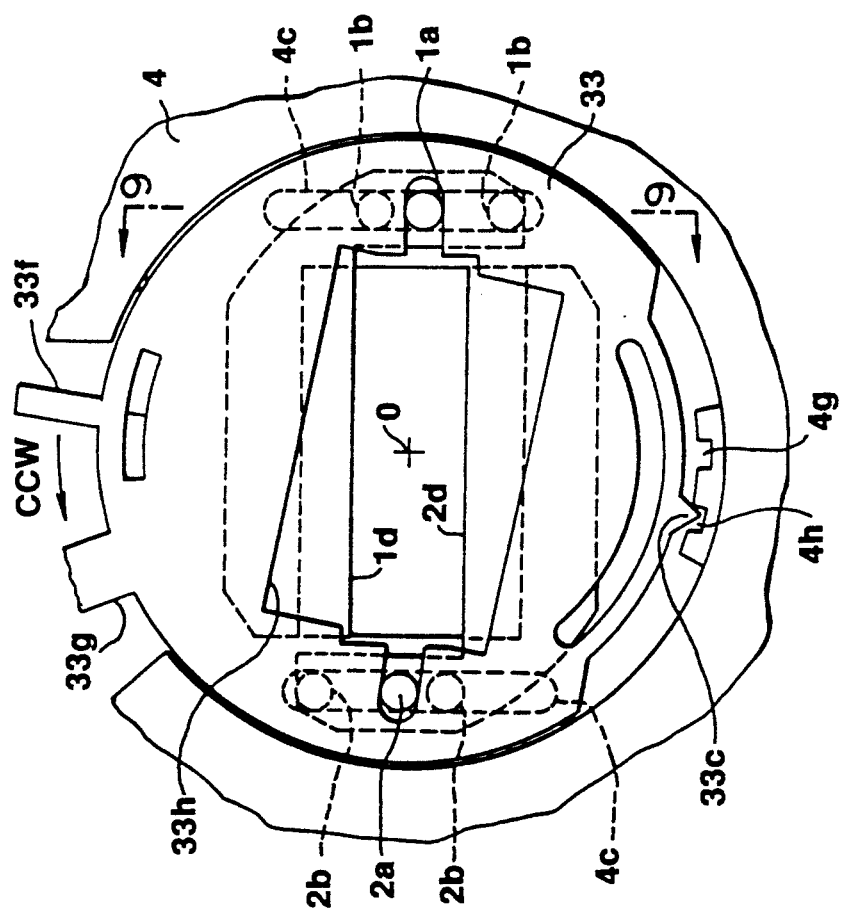
FIG. 8 is an elevation of a picture size switching mechanism part in the P photographing mode in the camera in the above mentioned FIG. 1.

FIG. 6 is an elevation of the picture size switching mechanism part of this camera in the N photographing mode as seen from the photographed object side. FIG. 7 is a sectioned view on line 7—7 in the above mentioned FIG. 6. FIG. 8 shows an elevation of the picture size switching mechanism part in the P photographing mode. FIG. 9 is a sectioned view on line 9—9 in FIG. 8.

The above mentioned picture size switching mechanism part is arranged between the surface 4f of the mask part 4d of the camera body 4 and the end surface 5a of the fixed frame 5. The above mentioned switching mechanism is formed of masks 1 and 2 determining the real photographed picture size in the P photographing, a P ring 33 switching the mask position and an opening 4d of the body 4 determining the N size of a real picture in the N photographing. The P ring 33 and masks 1 and 2 are regulated in the axial direction by the end surface 5a of the fixed frame 5 and the P ring receiving surface 4e of the body 4. The P ring 33 is rotatably held by the outer peripheral receiving part 4a.

The masks 1 and 2 have pins 1b and 2b for guides in moving and fitted in the straight advancing guide groove 4c. The driving pins 1a and 2a provided in those masks are fitted in the incised grooves 33a and 33b. Further, the P ring 33 has contact surfaces 33e and 33d with which the stopper 4b of the body 4 is in contact to determine the N and P photographing positions. The clicking projection 33c of the P ring 33 fits in the clicking groove 4g or 4h of the body 4, has a clicking holding force and is held in the above mentioned P and N photographing positions.

The operation of the picture size switching mechanism shall be explained in the following.

In the N photographing mode in FIG. 6, the mask A1 and mask B2 are separated from each other and are positioned outside the range of the mask opening 4d and therefore the N size (full size) of the real picture will be determined by the opening 4d. Also, in this state, the contact surface 33d of the P ring is in contact with the stopper 4b and the clicking projection 33c fits in the clicking groove 4g. When the P ring operating arm 33f is rotated in the CW direction from this position, the pins 1a and 2a of the mask 1 and 2 will be driven by the incised grooves 33a and 33b of the P ring 33 and the masks 1 and 2 will move downward or upward along the guide groove 4c of the body 4. When further rotated, the contact surface 33e will contact the stopper 4b, the P ring 33 will be positioned in the P photographing mode position shown in FIG. 8 and the clicking projection 33c will fit in the clicking groove 4h. In this state, the masks 1 and 2 will approach each other and will form areas of the real-picture size of the P size (panorama size) with the respective end surfaces 1d and 2d.

By the way, in order to return to the N photographing mode state again, the operating arm 33f of the P ring 33 is rotated CCW so that the state in FIG. 6 may be returned. Also, in this embodiment, the shape of the opening 33 in the center of the P ring has necessary minimum dimensions not smaller than of the body opening 4d so as to shield unnecessary lights as much as possible.

The magnification varying mechanism of the finder optical system operatively connected with the zooming and picture size switching operations of the camera of this embodiment shall be explained in the following.

Figure 10:
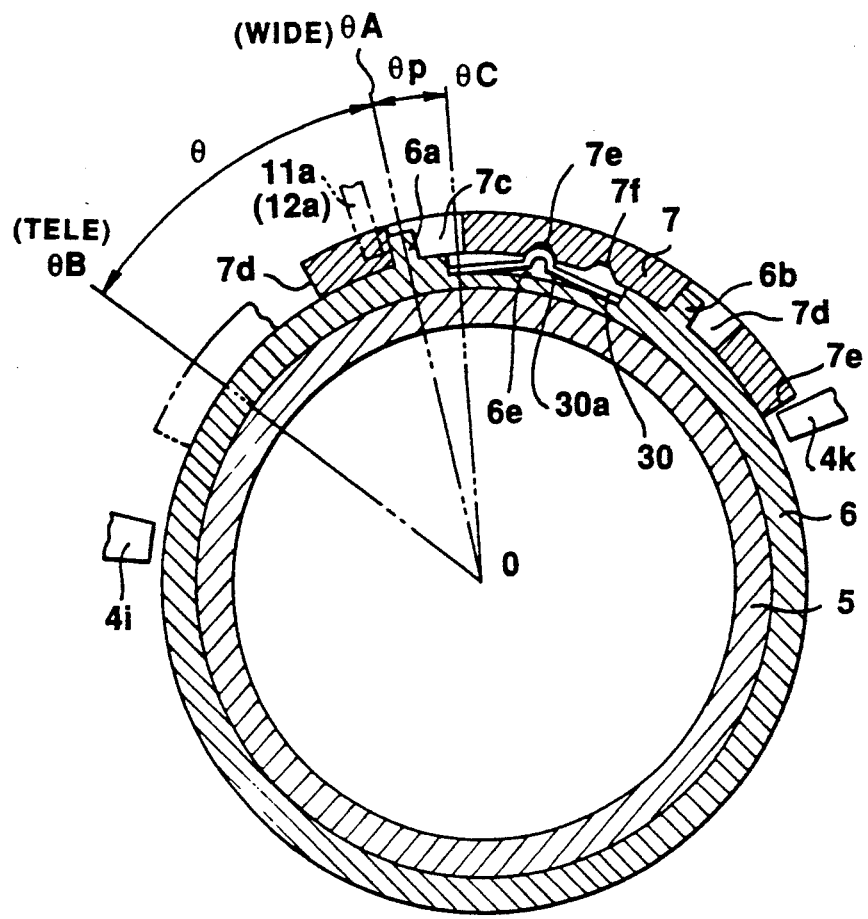
FIG. 10 is a vertically sectioned view showing the relative position relation of a cam ring and finder cam in the N photographing mode of the camera in the above mentioned FIG. 1.
Figure 11:
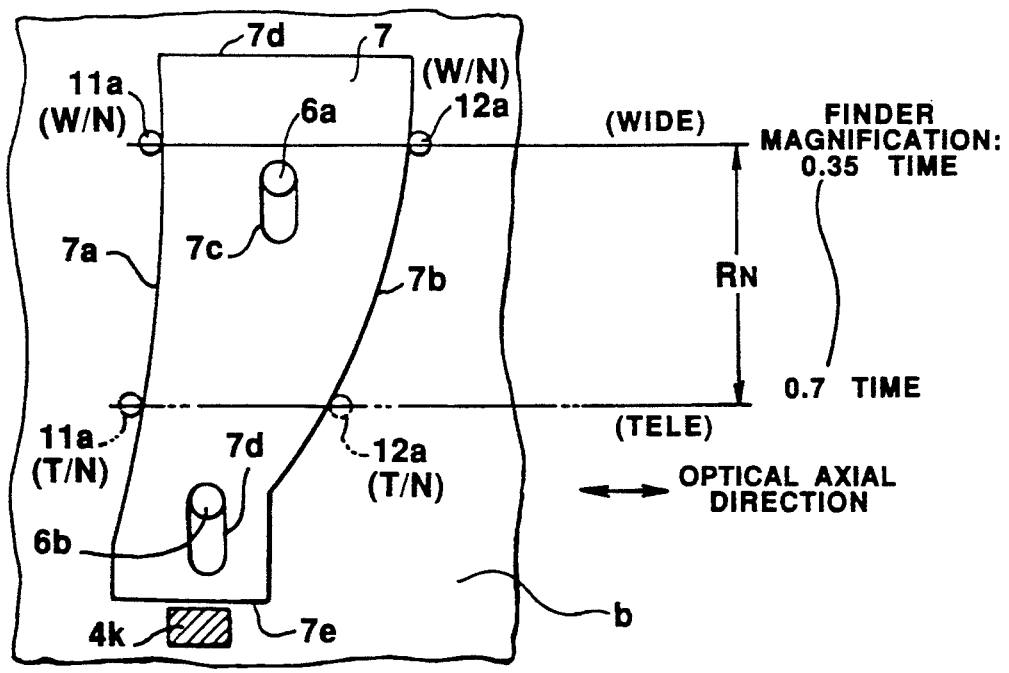
FIG. 11 is a developed view of the finder cam in the above mentioned FIG. 10.
Figure 12:
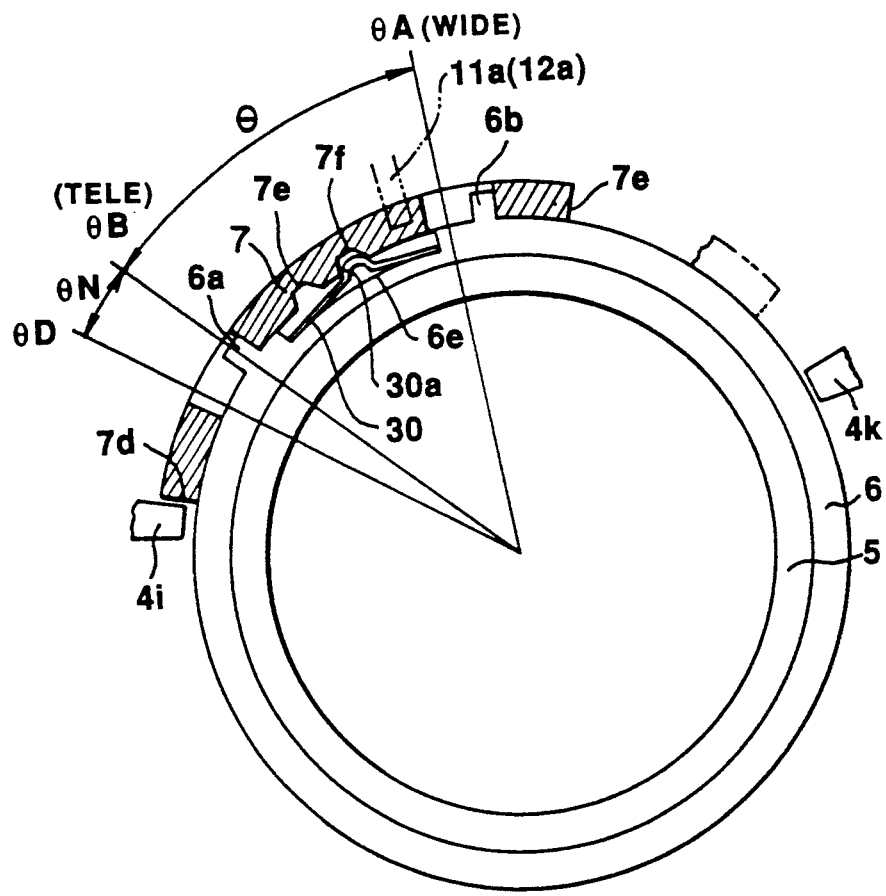
FIG. 12 is a vertically sectioned view showing the relative position relation of a cam ring and finder cam in the P photographing mode of the camera in the above mentioned FIG. 1.
Figure 13:
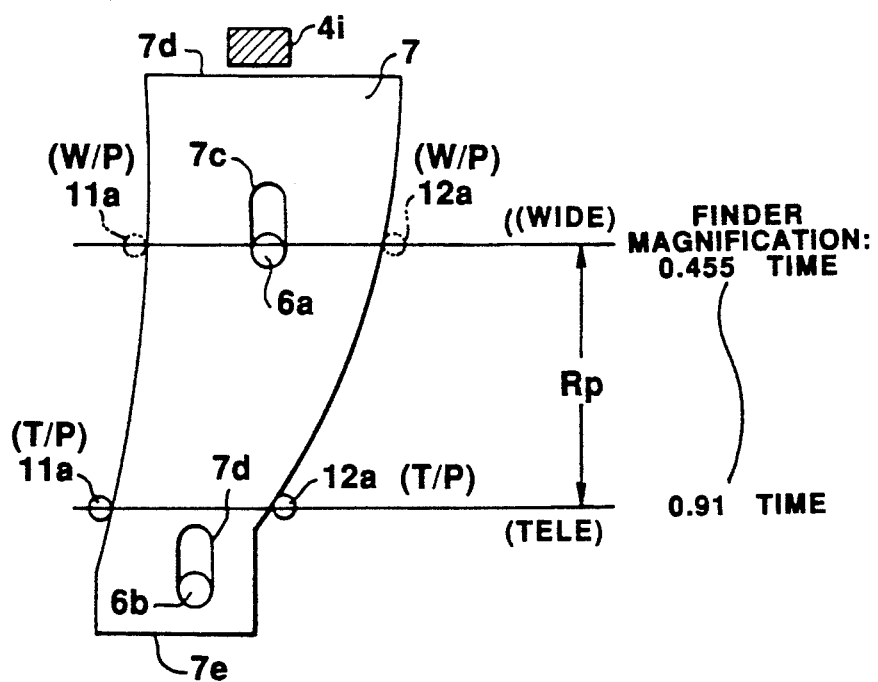
FIG. 13 is a developed view of the finder cam in the above mentioned FIG. 12.

FIGS. 10 and 11 are respectively a vertically sectioned view and developed view of the finder cam 7 and cam ring 6 in the wide state in the N photographing mode. FIGS. 12 and 13 are respectively a vertically sectioned view and developed view in the tele state in the P photographing mode. The rotatable finder cam 7 is held and arranged in either of two positions through a later described correlative position holding mechanism on the outer periphery of the cam ring 6. In the holding state as it is, in the cam ring 6 zooming rotating range $\theta$, the finder cam 7 and cam ring 6 rotate integrally. By the way, in FIGS. 10 and 12, the cam ring 6 rotating angle $\theta$ in the N photographing mode is the guide pin 6a rotating angle which is an angle represented by the range of the wide position angle $\theta A$ to the tele position angle $\theta B$.

As shown in FIGS. 10 and 11, in the N photographing mode, the cam pin 11a of the F frame 11 of the finder and the cam pin 12a of the F frame 12 are in contact respectively with the cam surfaces 7a and 7b of the finder cam 7 by the energizing force of the F frame spring 14 (See FIG. 1). By the way, the pin positions 11a and 12a (W/N) represent pin positions in the wide state in the N photographing. When the cam ring 6 is rotated to the tele position by the zooming operation, the cam pins 11a and 12a of the F frames 11 and 12 will slide while in contact with the cam surfaces 7a and 7b of the finder cam 7 to reach the pin positions 11a (T/N) and 12a (T/N). The range from the (W/N) position to (T/N) position of the pins 11a and 12a is the first region RN of the finder cam 7 used at the time of the N photographing. The finder magnification is 0.35 time to 0.7 time.

In order to switch the N photographing mode in FIG. 10 over to the P photographing mode in FIG. 12, the cam ring 6 in FIG. 10 is rotated by an angle $\theta P$ over the wide end to the switching rotating position $\theta C$ (position of the pin 6a) to the P photographing mode. At this time, the end surface 7e of the finder cam will contact and press the stopper 4k of the camera body and therefore the finder cam 7 will be rotated and moved substantially by an angle $\theta P$ with respect to the pin 6a against the holding force of the above mentioned position holding mechanism and will be positioned in the relative position of the P photographing mode state. This state is a wide state.

FIGS. 12 and 13 show a tele state of the P photographing. When the cam ring 6 is rotated to the wide side from this state, the cam pins of the F frames 1 and 2 will move while in contact with the cam surfaces 7a and 7b from the 11a and 12a (T/P) positions to the 11a and 12a (W/P) positions. This range is the second region Rp of the finder cam 7 used for the P photographing. The finder magnification is of a value of 0.455 time to 0.91 time larger than in the above mentioned N photographing. By the way, as definite in FIGS. 11 and 13, the second region Rp of the finder cam 7 is formed by continuously extending the first region RN.

By the way, in order to return the N photographing state again, as shown in FIG. 12, the cam ring 6 is rotated by the N photographing switching angle $\theta N$ over the tele end, that is, to the rotating position $\theta D$. By this operation, the end surface 7d of the finder cam 7 will contact the stopper 4i of the body and further the finder cam 7 will rotate CW relatively to the cam ring 6 and will be positioned in the relative position in the N photographing state. However, the position then is a tele position and, in the state shown in FIG. 10, the cam ring 6 has been driven to the wide position.

Thus, in the finder of the camera of this embodiment, the finder cams used in the prior art example are prepared in two regions and are respectively used as operatively connected with the picture size switching operation so that a finder easy to see may be made.

The relative position holding mechanism of the above described cam ring 6 and finder cam 7 shall be explained in detail in the following.

The above mentioned holding mechanism of this embodiment uses a clicking stop mechanism. As shown in FIGS. 10 and 12, clicking grooves 7e and 7f are formed in the finder cam 7. A recess 6e for holding the clicking spring 30 is formed in the cam ring 6. Further, a convex projection 30a for dropping into the clicking grooves 7e and 7f is formed in the clicking spring 30. By the way, the finder cam 7 not illustrated is regulated in the radial direction so as to be slidable on the outer periphery of the cam ring 6 and to be rotatable in the peripheral direction along the guide pins 6a and 6b.

In FIG. 10, the projection 30a of the clicking spring 30 has dropped in the clicking groove 7e and therefore, in this state, the cam ring 6 and finder cam 7 can integrally rotate. In noticing the guide pin 6a, it is found that, when the pin 6a is moved in the range of an angle $\theta$, the wide and tele states in the N photographing state will be able to be set. When the cam ring 6 is rotated CW by an angle $\theta P$ from the state in the drawing, the end surface 7e of the finder cam 7 will contact the body stopper 4k and, when further rotated, the projection 30a will drop into the clicking groove 7f and the fitting position will be switched. By this switching operation, the relative position relation of the cam ring 6 and finder cam 7 will be the P photographing cam setting state and, when the position of the guide pin 6a of the cam ring 6 is returned to $\theta A$ from $\theta C$, the wide state in the P photographing will be set.

In the same manner, in the tele state of the P photographing in FIG. 12, when the cam ring 6 is rotated CCW by an angle $\theta N$, the end surface 7d of the cam 7 will contact the body stopper 4i and, as the cam ring 6 is further rotated, the finder cam 7 will rotate relatively with the cam ring 6, the projection 30a of the spring 30 will be switched from the clicking groove 7f to drop into the clicking groove 7e and the relative position relation of the cam ring 6 and finder cam 7 will be the N photographing mode cam setting state. When the guide pin 6a of the cam ring 6 is returned to the position $\theta B$, the N photographing tele setting state will be made.

FIG. 14 shows the arrangement of the respective operating states of the cam ring 6 and finder cam 7 in FIGS. 10 and 12 and shows with what region of the cam surfaces 7a and 7b the cam pins 11a and 12a slide in contact in the respective set states. By the way, a clicking stopping mechanism is applied to the relative position holding mechanism in this embodiment but a mechanism utilizing a holding force by friction or a mechanism utilizing a holding force of a clicking action and friction action is also possible.

Figure 15:
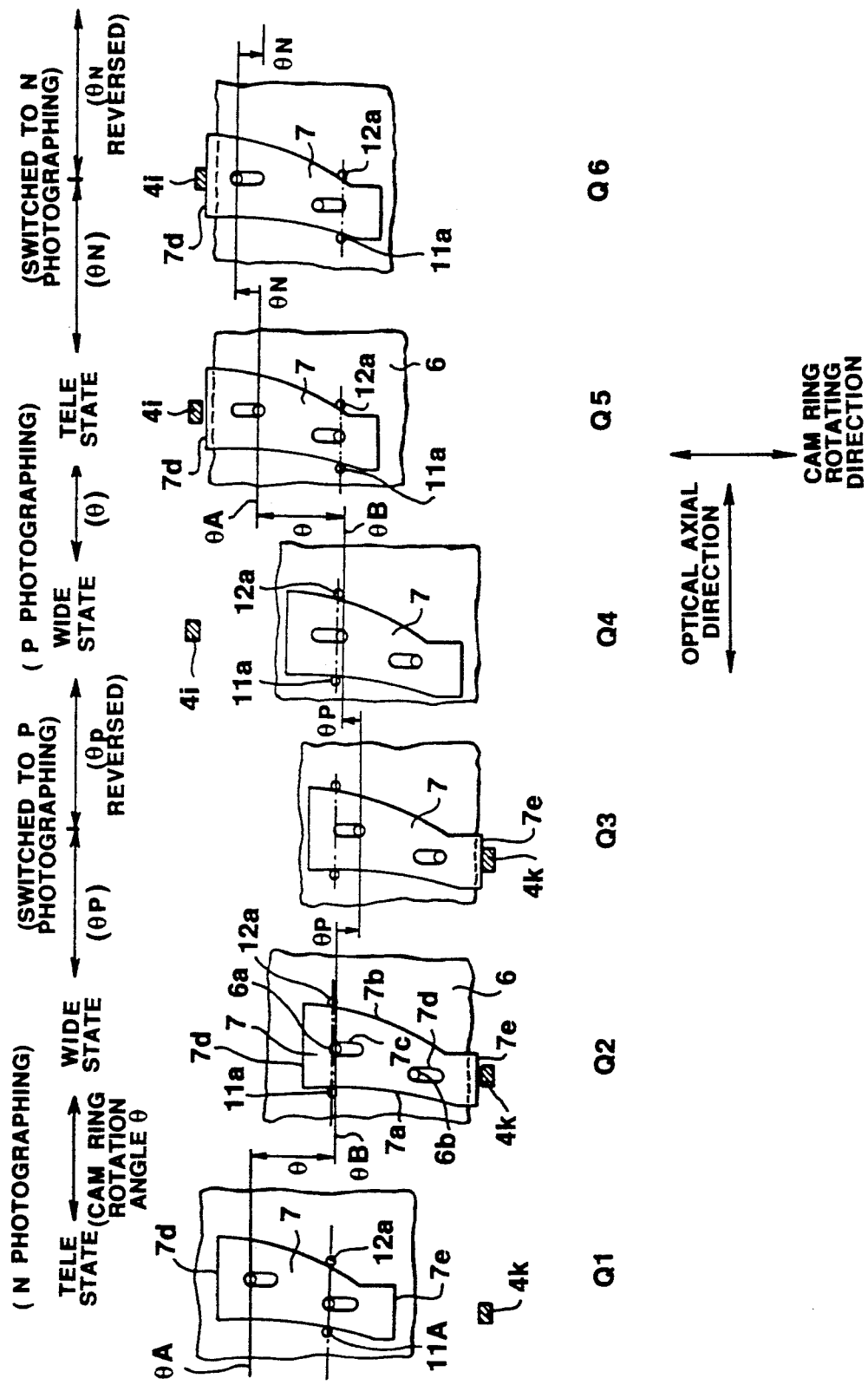
FIG. 15 is a developed operating state view of the cam ring and finder cam as switched to the N/P photographing mode of the camera in the above mentioned FIG. 1.

FIG. 15 shows by a developed view the operating state of the cam ring 6 and finder cam 7 in FIG. 14. The states Q1 to Q2 represent the positions of the cam ring 6 and finder cam 7 corresponding to the N photographing mode. The cam ring 6 carries out zooming in the angle $\theta$ between the positions $\theta A$ and $\theta B$. The states Q2 to Q3 represent an operating section for switching to the P photographing state wherein the finder cam 7 is contacted with the stopper 4k and, as described above, the cam ring 6 and finder cam 7 are rotated ($\theta P$) to switch their relative positions. Thereafter, when the cam ring 6 is reversely rotated by the angle $\theta P$, the state Q4 will be made. This state is a wide state of the P photographing mode.

The states Q4 to Q5 represent the position relation state of the cam ring 6 and finder cam 7 in the P photographing mode. The cam ring 6 and finder cam 7 integrally rotate in the range of the angle $\theta$. In the same manner, in this angle $\theta$, any focal length can be set. The operation of the states Q5 to Q5 represents a switching operation to the N photographing mode wherein the finder cam 7 is contacted with the body stopper 4i and, as described above, the cam ring 6 and finder cam 7 are rotated ($\theta N$) to vary their relative positions.

Thereafter, when the cam ring 6 is reversely rotated by the angle $\theta N$, the above mentioned state Q1 will return. By the way, though a matter of course, if the cam ring 6 is rotated as mentioned above, the P photographing state and N photographing state will be able to be switched over to each other even from any focal length state.

By the way, the cam ring 6 is rotated on the basis of the drive of the zooming motor 10a by a controlling circuit not illustrated usually in the range Of the angle $\theta$. The cam ring 6 of angles $\theta N$ and $\theta P$ for switching the mode can be rotated in the same manner by the drive of the zooming motor 10a. By providing a real picture of the P ring 33 and an electric switch operatively connected with the visual field frame switching operation, the driving indication of the zooming motor 10 can be used as an angle $\theta N$ driving signal switching the output of this switch to the N photographing mode or an angle $\theta P$ driving signal switching to the P photographing mode.

In this embodiment, the finder magnifications in the N photographing mode and the P photographing mode are of such values as are shown in FIG. 14 and therefore the ratio of them is made 1.3. When the variation of this finder magnification is extremely small, the effect on the visual field will be naturally small. On the contrary, when the variation is extremely large, the operating amount of the visual field mask 16 shown in FIG. 5 will be made large and further the shape of the poro-prism 15 will have to be made large.

In consideration of the balance of the effect on the finder visual field and the size of the finder frame, it is suggested to set the finder magnification in the P photographing in this embodiment to be in the range of the finder magnification in the N photographing X (1.1 to 1.4).

Figure 16:
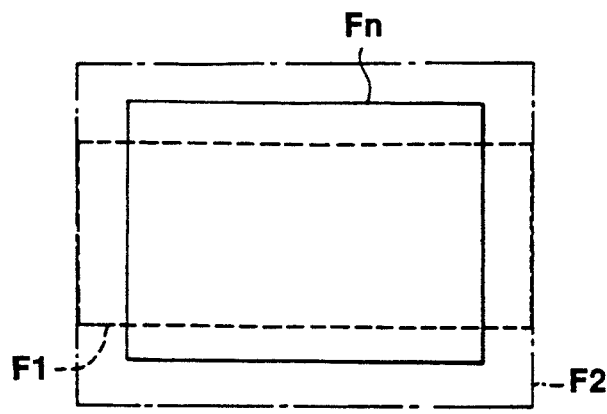
FIG. 16 is a view showing respective visual field frames for photographed pictures of the camera in the above mentioned FIG. 1.

The visual field frame Fn shown in FIG. 16 is the finder visual field frame in the N photographing but, in the case of elevating the finder magnification, if the magnification of the size of the visual field frame is elevated in both vertical and horizontal directions, the visual field frame will become large as in the visual field frame F2. The shapes of the objective lens system, prism and eyepiece lens system of the finder will become large vertically and horizontally and, in case they are actually fitted to the camera, the height of the camera will be influenced. Therefore, in the case of elevating the finder magnification, in this embodiment, the visual field frame will be made large only in the horizontal direction. Without increasing the height of the camera, the visual field frame in the P photographing will be made such visual field frame F1 as is shown in FIG. 16.

Figure 17:
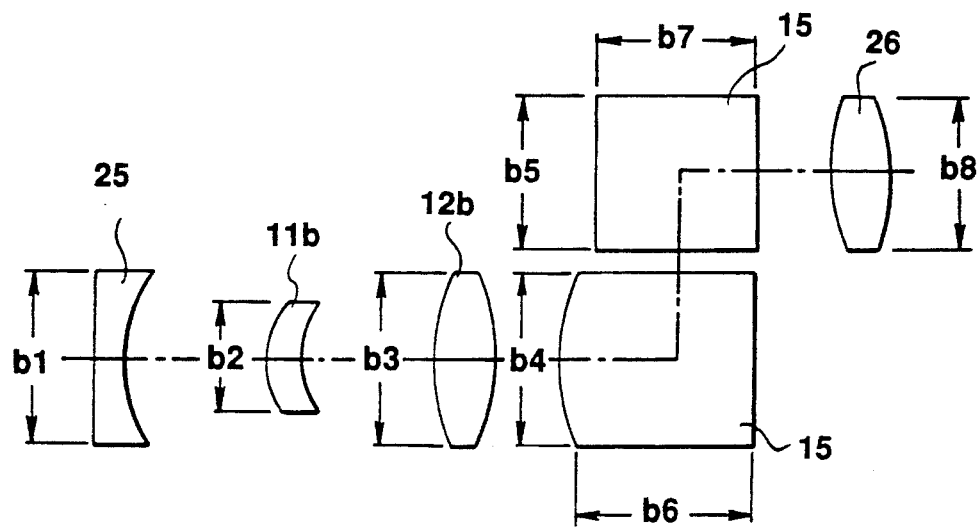
FIG. 17 is a plan view of an essential part of the finder optical system of the camera in the above mentioned FIG. 1.
Figure 18:
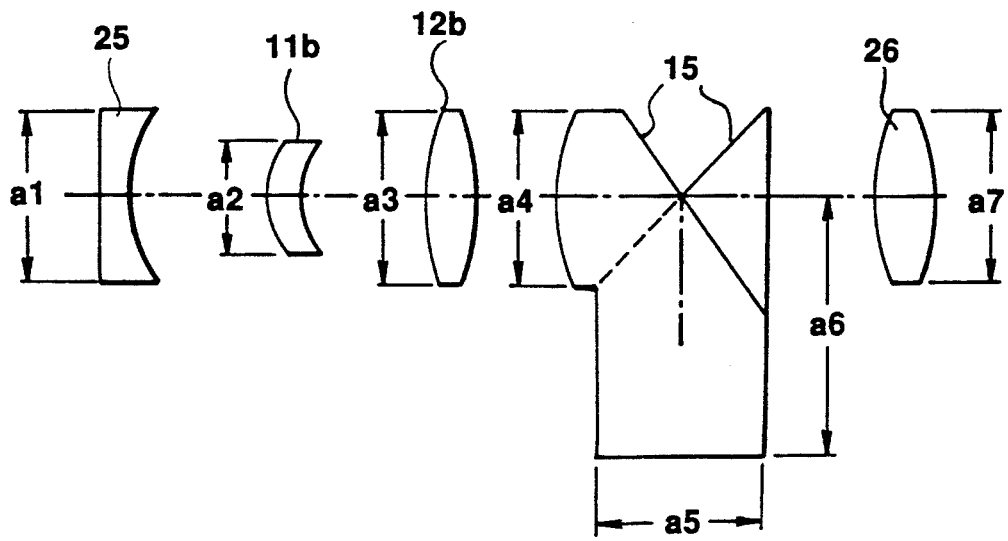
FIG. 18 is a side view of an essential part of the finder optical system of the camera in the above mentioned FIG. 1.

FIGS. 17 and 18 show the approximate dimensions of the shape of such finder system. FIG. 17 is a plan view of the finder system. FIG. 18 is a side view. The reference numeral 25 represents an objective lens system, 11b and 12b represent magnification varying lenses, 26 represents an eyepiece lens system and 15 represents a porro-prism. If both vertical and horizontal magnifications in the N photographing are increased as described above, all the dimensions corresponding to a1 to a7 and b1 to b8 of the respective objective lens system, magnification varying lens, prism and eyepiece lens system will become large but, as in this embodiment, when the finder visual field is expanded only in the horizontal direction, only the dimensions b1 to b8 and a6 will be expanded. By the way, the dimension a6 will become large because the light beam rotates by 90 degrees in the porro-prism 15. When only the horizontal visual field in the P photographing is expanded, without varying most of the vertical dimensions of the finder components, a large visual field frame easy to see in the P photographing mode will be able to be provided.

As described above, in the camera of this embodiment, as operatively connected with the switching of the photographed picture, the magnification of the finder optical system and the visual field frame of the finder are simultaneously altered and particularly, in the case of switching to the P photographed picture, a finder image very easy to see will be obtained. As a region to be used in the normal photographing and a region to be used when the P photographed picture is switched are formed in the finder cam giving the above mentioned magnification, there is an effect that the above mentioned magnification can be altered with a simple mechanism, By the way, the camera of this embodiment can be applied not only to the cameras of the above explained respective embodiments but also to a tele and wide two-focus switching camera and an electronic camera fitted with an optical finder.

The camera shown in the second embodiment of the present invention shall be explained in the following.

Figure 19:
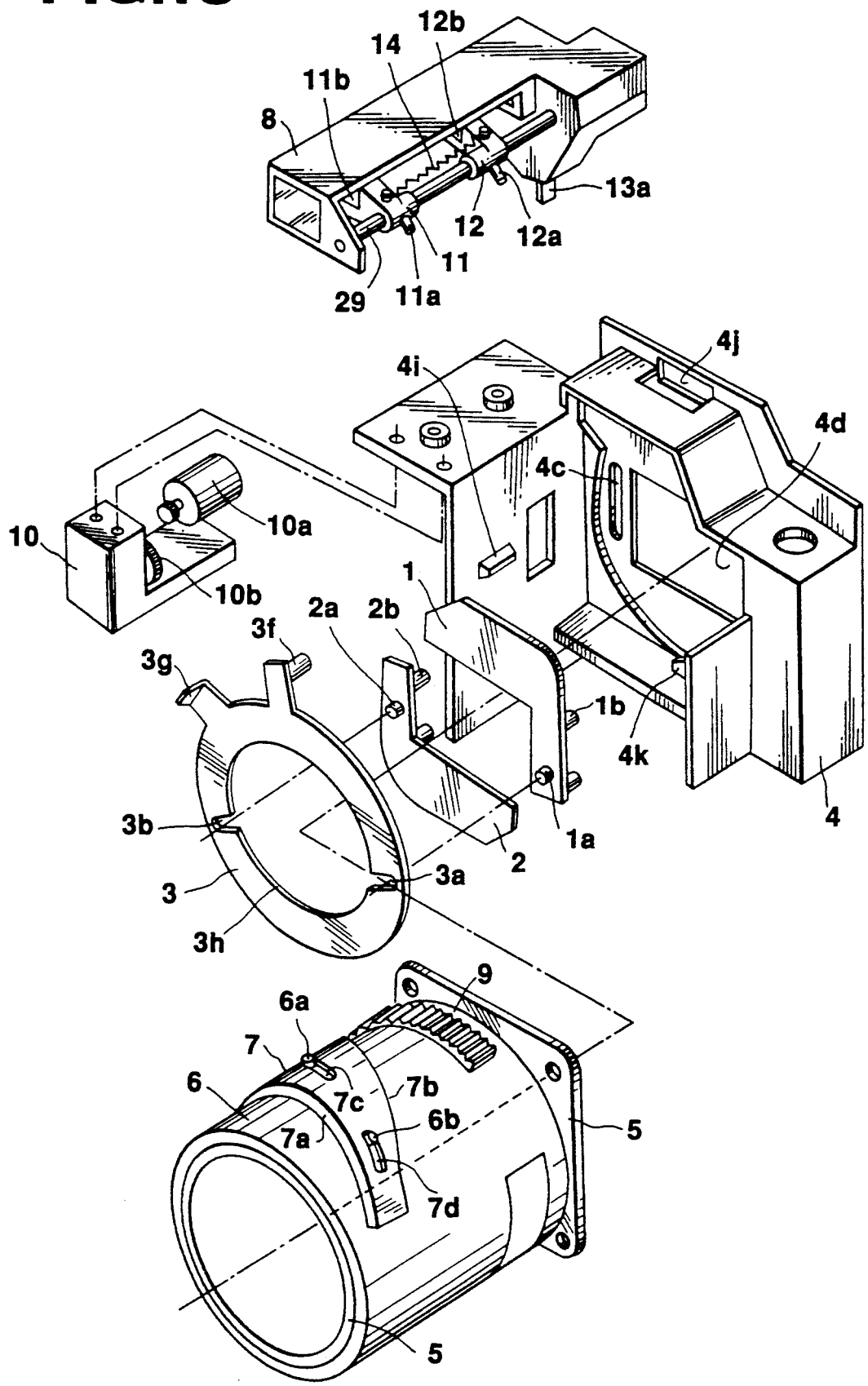
FIG. 19 is an exploded perspective view of a camera showing the second embodiment of the present invention.

FIG. 19 is an exploded perspective view of a camera showing the second embodiment. The camera of this embodiment is different from that of the above mentioned first embodiment in respect of the shape of the P ring in the photographed picture switching mechanism part. In the camera of the above mentioned first embodiment, the above mentioned opening 33 is made a rectangle which is a necessary minimum shape by considering the light interception to be important but, in the camera of this second embodiment, the central opening 3h is made a circular opening as shown in FIG. 19 to make the P ring 3 light. The P ring 3 moves the above described masks A1 and B2 to respective picture size switching positions through the masks A1 and B2 driving pins 1a and 2a fitting in incisions 3a and 3b provided on the inner periphery by operating the operating arm 3f. The pin 3f of the P ring 3 is inserted into the stopper hole 4j of the body 4 to regulate the position of the P ring 3. This regulated position gives photographed picture sizes corresponding to the N photographing and P photographing of the masks A1 and B2. The driving arm 3g presses the operating arm 13a of the visual field mask switching lever 13 of the above mentioned finder unit and gives the size of the finder visual field frame corresponding to the above mentioned photographed picture size.

By the way, the other formations of the camera of this embodiment are the same as in that of the first embodiment and are shown in FIG. 19 by bearing the same reference numerals as in the first embodiment.

The camera showing the third embodiment of the present invention shall be explained in the following.

Figure 20:
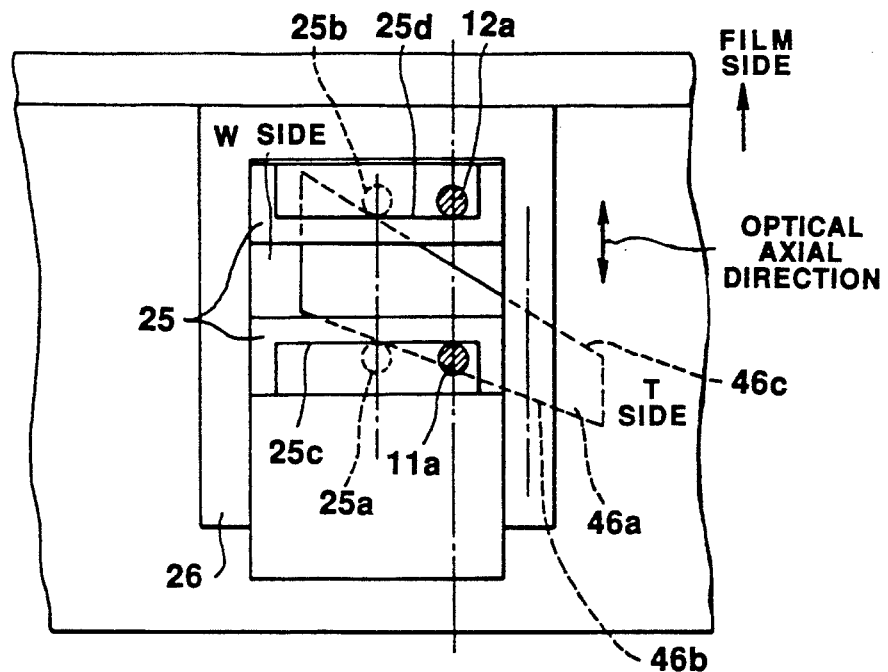
FIG. 20 is a developed view of a finder cam part in the N photographing mode of a finder optical system magnification varying mechanism of a camera showing the third embodiment of the present invention.
Figure 21:
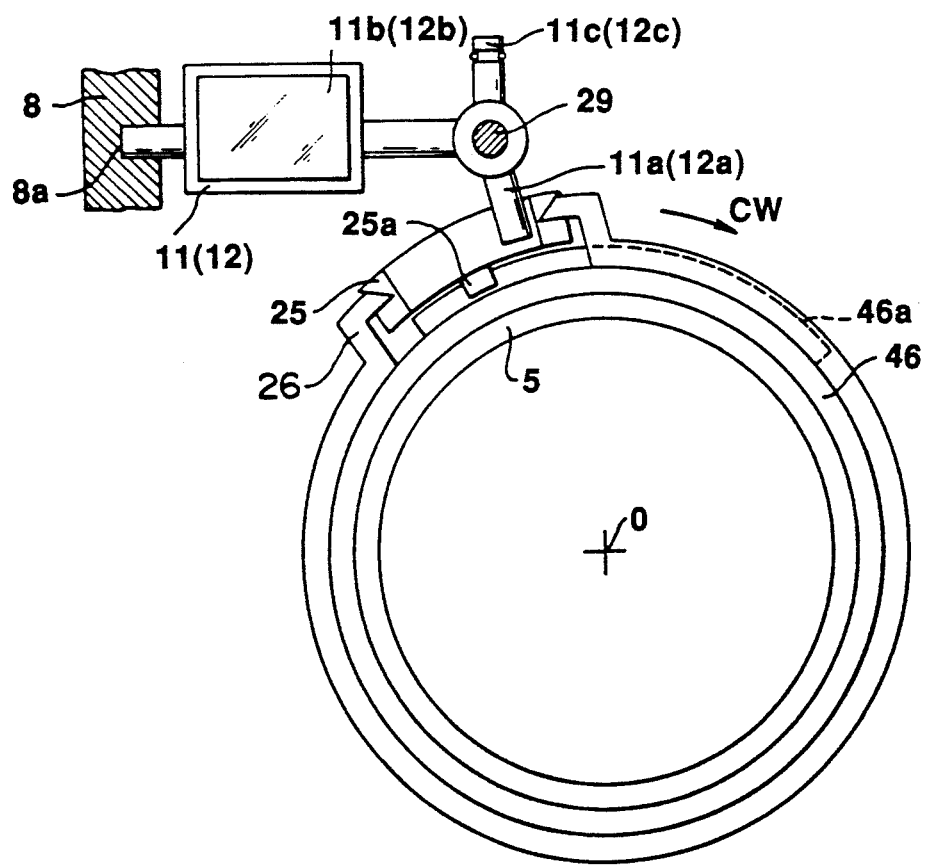
FIG. 21 is a vertically sectioned view of the finder cam part of the finder optical system magnification varying mechanism in the above mentioned FIG. 20.
Figure 22:
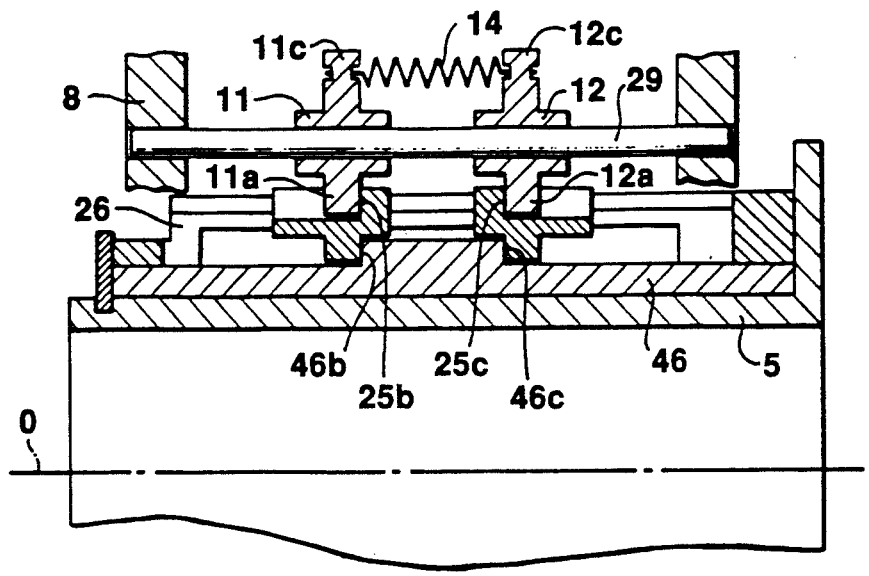
FIG. 22 is a longitudinally sectioned view of the finder cam part of the finder optical system magnification varying mechanism in the above mentioned FIG. 20.
Figure 23:
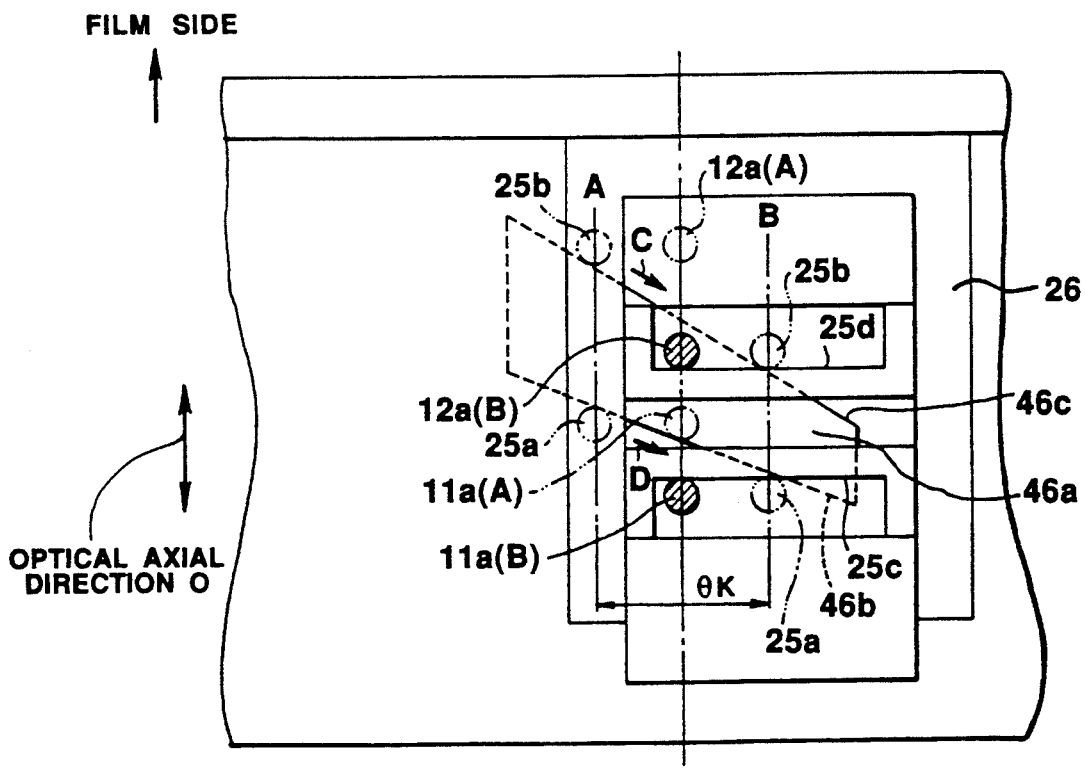
FIG. 23 is a developed view of the finder cam part in the P photographing mode of the finder optical system magnification varying mechanism in the above mentioned FIG. 20.

The camera of this third embodiment is different from that of the above mentioned first embodiment in the finder magnification varying switching mechanism but the other formations are the same and bear the same reference numerals in FIGS. 20 to 23. FIGS. 20 and 23 are developed views of the cam ring and finder cam part in the N photographing and P photographing. FIG. 21 is an elevation of the cam ring and finder cam part in the N photographing. FIG. 22 is a longitudinally sectioned view of the same. As shown in FIGS. 20 to 23, the cam ring 46 is rotatably supported on the outer periphery of the fixed frame 5 holding the photographing lens system. The finder cam 46a which is a zooming cam of the optical system of the finder is integrally formed on the cam ring 46. A guide rail 26 is rotatably fitted in the outer periphery of the cam ring 46. Two block sliders 25 are supported slidably in the optical axial direction in the rail parts of the guide rail 26. The above mentioned sliders 25 are driven along the finder cam 46a. Further, the F frames 11 and 12 of the finder unit are driven through the sliders 25.

As in FIGS. 22 and 23, the above mentioned finder cam 46a has a zooming range wider than the zooming range of the corresponding photographing lens. That is to say, it has a wide side end part as a wide position in the N photographing and has a tele side end part as a tele end in the P photographing. In switching the P and N photographing modes, the zooming range in the N photographing and the zooming range in the P photographing are switched by giving a rotating angle difference of a switching angle θK to the guide rail 26. The slider 25 transmitting the displacement of the finder cam 46a to the F frames 11 and 12 of the finder is divided into two blocks which are fitted to the rails of the rotatable guide rail 26 fitted to the outer peripheral part of the cam ring 46 so as to be able to advance and retreat. The slider 25 is fitted to the two blocks as mentioned above corresponding to the cam surfaces 46b and 46c of the finder cam 46a. The cam pins 25a and 25b of slider 25 respectively contact the cam surfaces 46b and 46c.

The F frames 11 and 12 which are lens frames of the magnification varying lenses of the finder are supported movably in the optical axial direction of the lens by the rail surface 8a of the finder body 8 and the guide shaft 29 fixed to the finder body. The pins 11a and 12a respectively integral with the F frames 11 and 12 contact the contact surfaces 25c and 25d of the slider 25 intersecting substantially at right angles with the photographing lens optical axis 0. Such F spring 14 as is shown in FIG. 22 is hung between the spring hangers 11c and 12c integral respectively with the F frames 11 and 12. The cam pins 25a and 25b integral respectively with the two sliders 25 respectively contact the cam surfaces 46b and 46c through the pins 11a and 12a and the contact surfaces 25c and 25d of the slider 25 by the energizing force of the F spring 14. The above mentioned guide rail 26 is connected with the arm not illustrated of the P ring 33 of the real picture switching member in FIG. 1 so as to integrally rotate.

The magnification varying operation of the camera of this embodiment formed as in the above shall be explained. By the way, the other formations than are mentioned above of the camera of this embodiment shall be explained by applying those shown in FIG. 1.

First of all, in order to switch the N photographing mode state to a P photographing mode state, when the P ring 33 is rotated CW in FIG. 21, the guide rail 26 will also rotate CW. When the P ring 33 is rotated to the stopper position, the guide rail 26 will rotate until the pins 25a and 25b of the slider 25 are positioned in the P photographing position B from the N photographing position A in FIG. 23. At this time, the cam pins 25a and 25b will rotate while in contact with the cam surfaces 46b and 46c by the energizing force of the F spring and therefore the slider 25 will displace in the optical axial direction of the photographing lens while sliding along the guide rail 26 to move in the direction of C and D on the finder cam 46a surface in FIG. 23.

The pins 11a and 12a of the F frame are in contact with the surfaces 25b and 25c and therefore move integrally with the slider 25. That is to say, the N photographing pin positions 11a (A) and 12a (A) move to the P photographing pin positions 11a (B) and 12a (B). The finder optical system lens moves in the optical axial direction along the finder cam 46a. Thus, the position of the finder optical system lens moves by the rotation of the finder cam 46a by the switching angle θK to be switched to the P photographing mode position. When the cam ring 6 is rotated in the thus set state, the zooming in the P photographing mode will be made.

Figure 24:
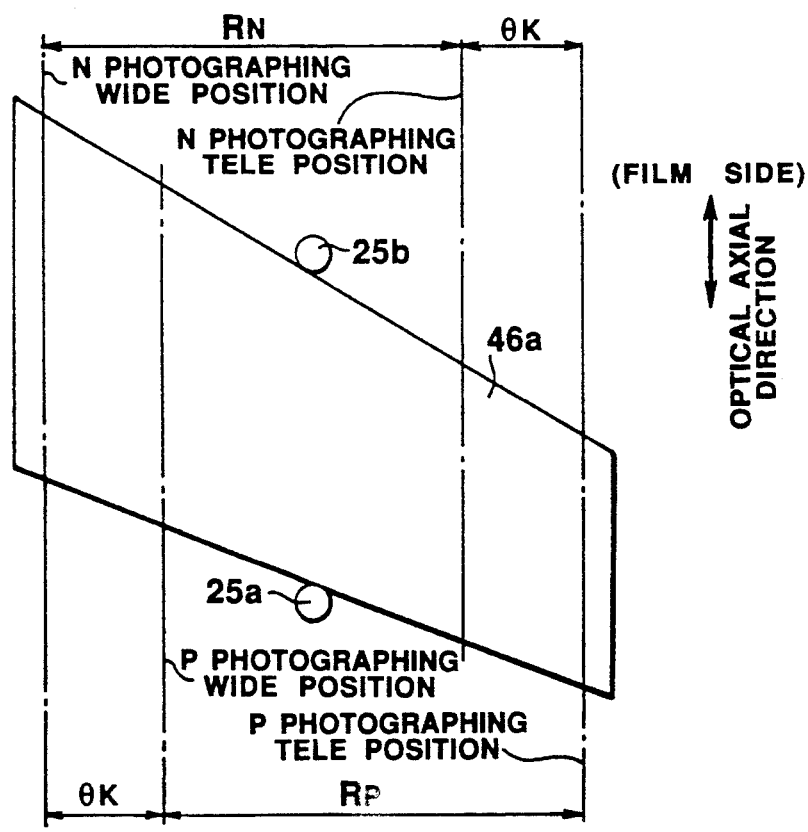
FIG. 24 is a developed view of the finder cam part in the N/P photographing mode switched state of the finder optical system magnification varying mechanism in the above mentioned FIG. 20.
Figure 25:
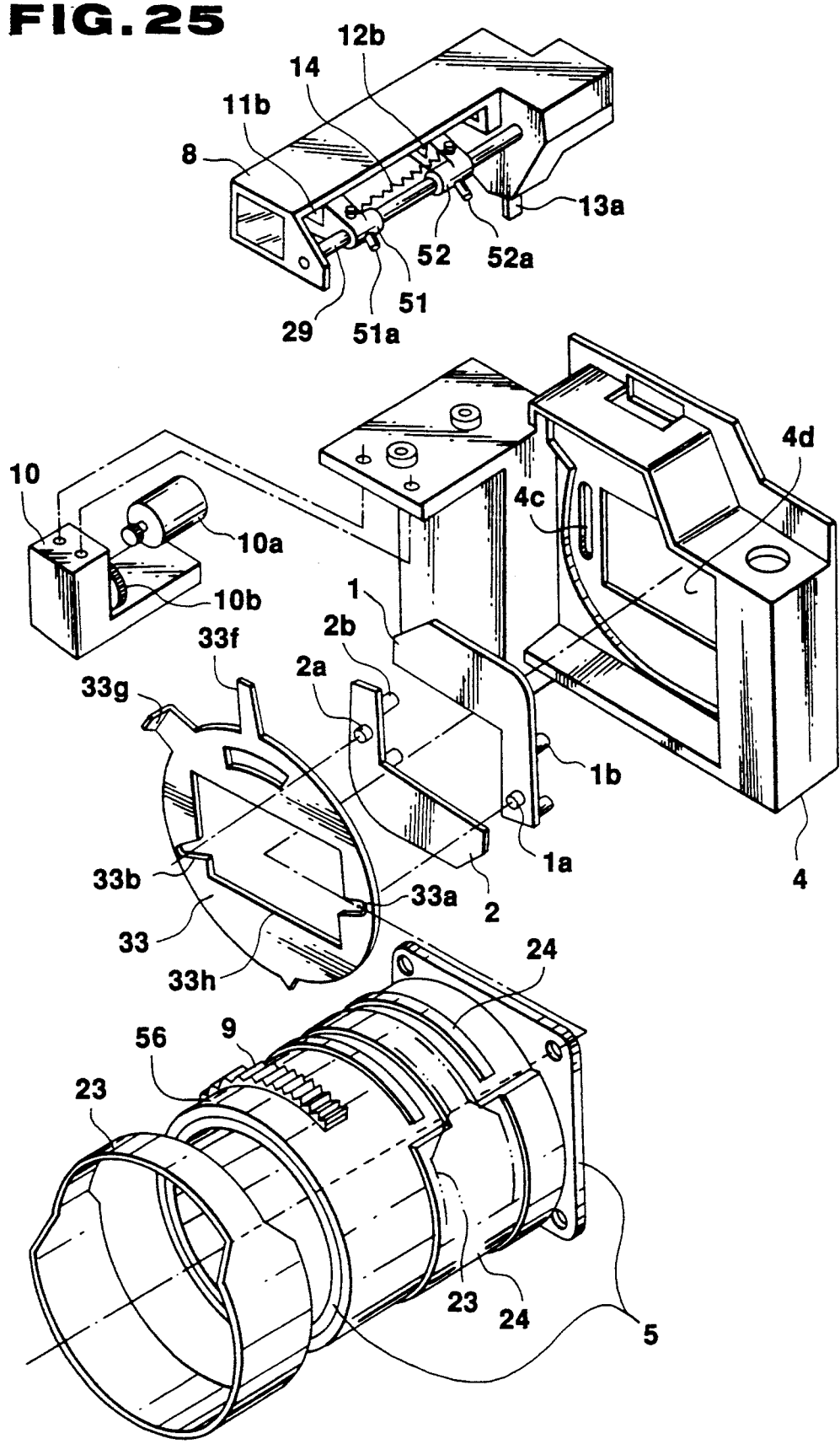
FIG. 25 is an exploded perspective view of a camera showing the fourth embodiment of the present invention.
Figure 26:
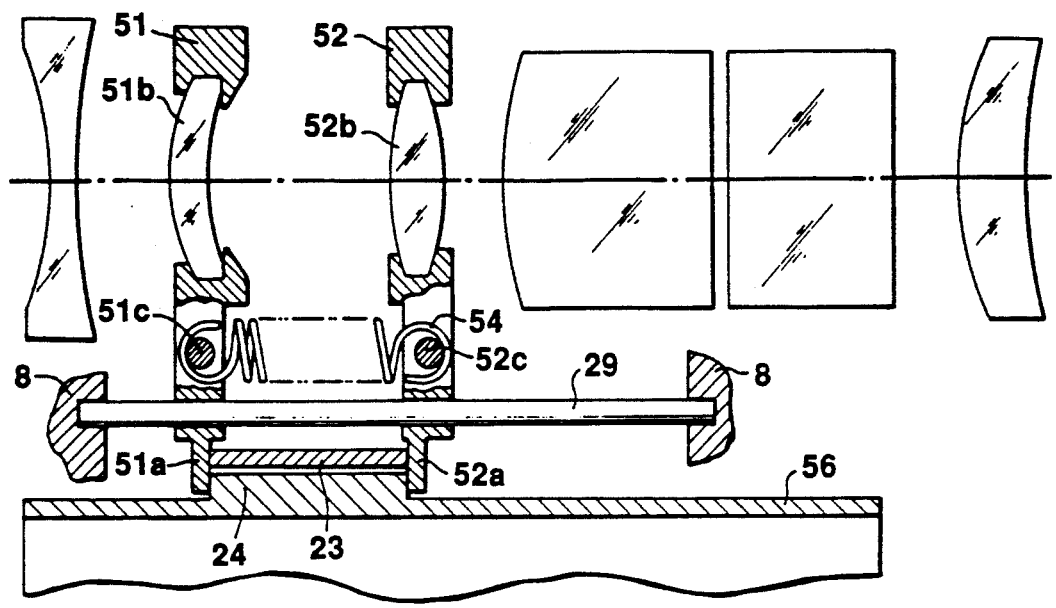
FIG. 26 is a longitudinally sectioned view of the finder magnification varying mechanism part of the camera in the above mentioned FIG. 25.
Figure 27:
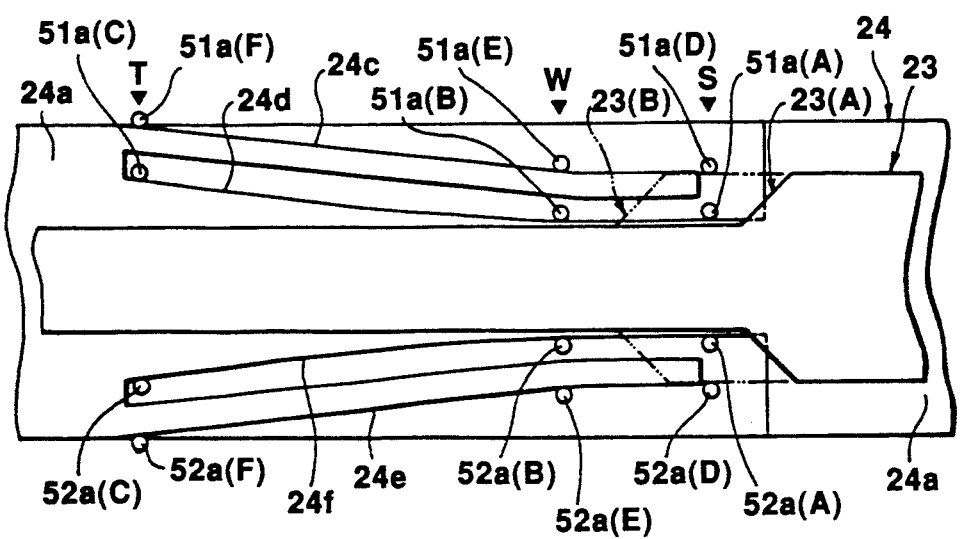
FIG. 27 is a developed view of a finder cam of the camera in said FIG. 25.

On the other hand, in order to switch to the N photographing mode, when the guide rail 26 is rotated by the switching angle θK in the reverse direction from the P photographing position B, the P photographing position B will be able to be switched to the N photographing position A. FIG. 24 is a developed view showing the operating positions of the above mentioned finder cam 46a. In the cam 46a, the zooming range in the N photographing state is the first region RN and the zooming range in the P photographing state is the second region RP.

In this embodiment, the N photographing and P photographing states can be switched to each other in any zooming set state. That is to say, in order to switch any focal length set position in the N photographing to that focal length set position in the P photographing, the guide rail 26 may be rotated by the angle θK or vice versa.

The camera of the fourth embodiment of the present invention shall be explained with reference to FIGS. 25 to 28.

An exploded perspective view of the main components of the camera of this embodiment is shown in FIG. 5. This camera is different from the camera shown in the above described FIG. 1 in the finder cam magnification switching structure but the other mechanism parts have the same formations as of the mechanism parts in FIG. 1 and shall bear the same reference numerals also in FIG. 25.

In the main formation of the finder magnification switching mechanism of the camera of this embodiment, a driving gear 9 and a finder cam 24 are integrally provided on the outer periphery of a cam ring 56 and a P/N switching ring 23 to be rotatably fitted in is arranged on the outer periphery of the finder cam 24. The operating surfaces of the cam surfaces 24d and 24f or 24c and 24e of the finder cam 24 can be selected to vary the magnification of the finder optical system in response to the N photographing mode and P photographing mode by the operation of the above mentioned P/N switching ring 23 (See FIG. 27).

The above mentioned finder magnification varying switching mechanism shall be explained more particularly. First of all, in FIGS. 26 and 27, at the time of the N photographing mode, the P/N switching ring 23 will be in the illustrated position of 23(A) and the finder second and third lenses 51b and 52b held by the F frames 51 and 52 will be driven by the N photographing mode cam surfaces 24d and 24f through the cam pins 51a and 51b.

That is to say, the cam pins 51a and 52a of the F frames 51 and 52 will contact the cam 24d and 24f surfaces of the first region of the finder cam 24 and will slide between the positions 51a (B) and 51a (C) and between the positions 52a (B) and 52a (C) with the zooming.

In order to switch to the P photographing mode, first, the photographing lens is housed and the cam pins 51a and 52a are moved to the S indicating positions 51a (A) and 52a (A) and the P/N switching ring 23 is rotated to the position 23 (B) through a mechanism not illustrated by the P ring 33 ( See FIG. 25 ) of the real picture switching mechanism. With this rotation, the cam pins 51a and 52a of the F frame will be pushed up to the positions 51a (D) and 52a (D).

In this state, when the photographing lens is payed out and zooming is made, the cam pins 51a and 52a will contact the cam 24c and 24e surfaces of the second region and will slide between the positions 51a (E) and 51a (F) and between the positions 52a (E) and 52a (F) to zoom the finder lens.

Further, in order to return the N photographing mode, the photographing lens is kept in the housing position, the cam pins 51a and 52a are returned to the positions 51a (D) and 52a (D), further the PN switching ring 23 is returned to the position 23 (A) and the cam pin is lowered to the positions 51a (A) and 52a (A) so that the N photographing mode may be returned. By the way, in FIG. 26, a spring 54 for contacting the cam pins 51a and 52a of the F frames 51 and 52 with the finder cam 24 and P/N switching ring 23 is hung on the spring supporting parts 51c and 52c of the F frame.

Figure 28:
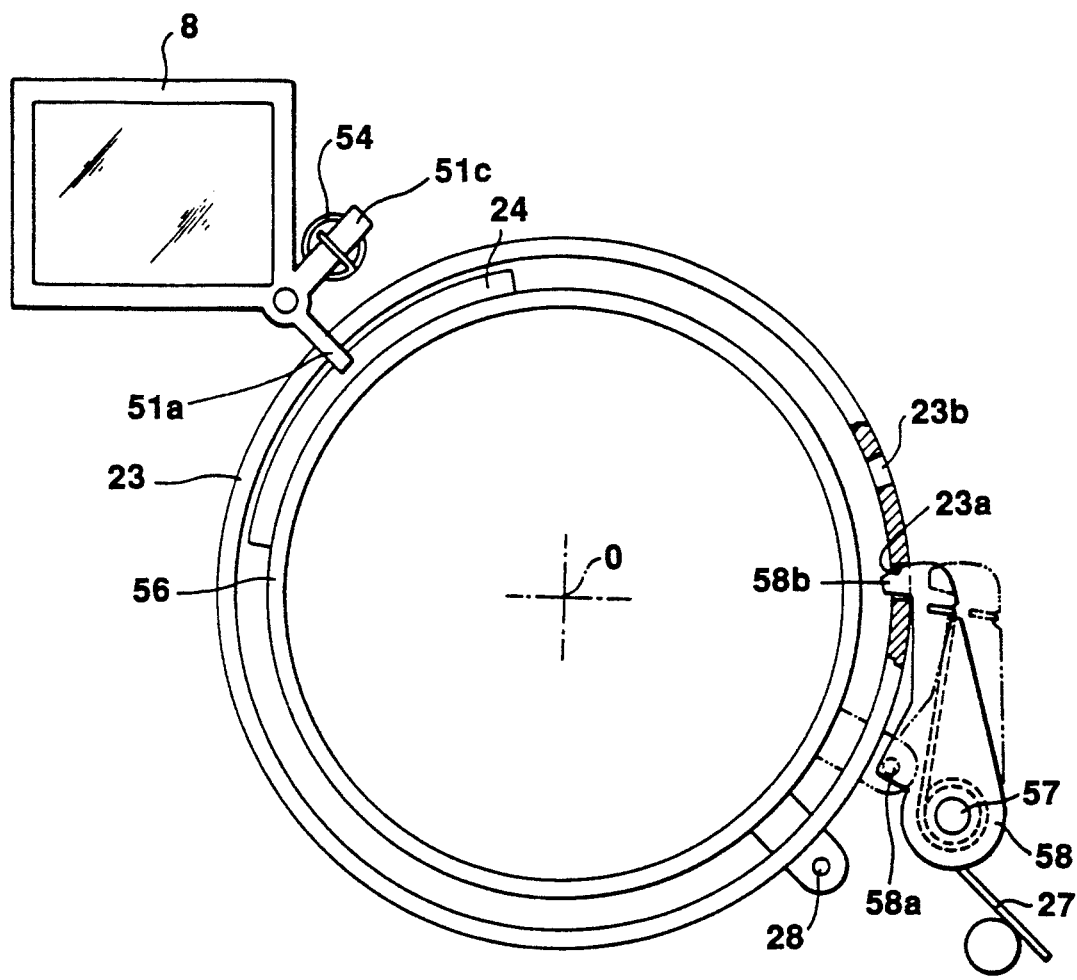
FIG. 28 is a vertically sectioned view of a P/N switching ring locking mechanism of the finder magnification varying mechanism part of the camera in the above mentioned FIG. 25.
Figure 29:
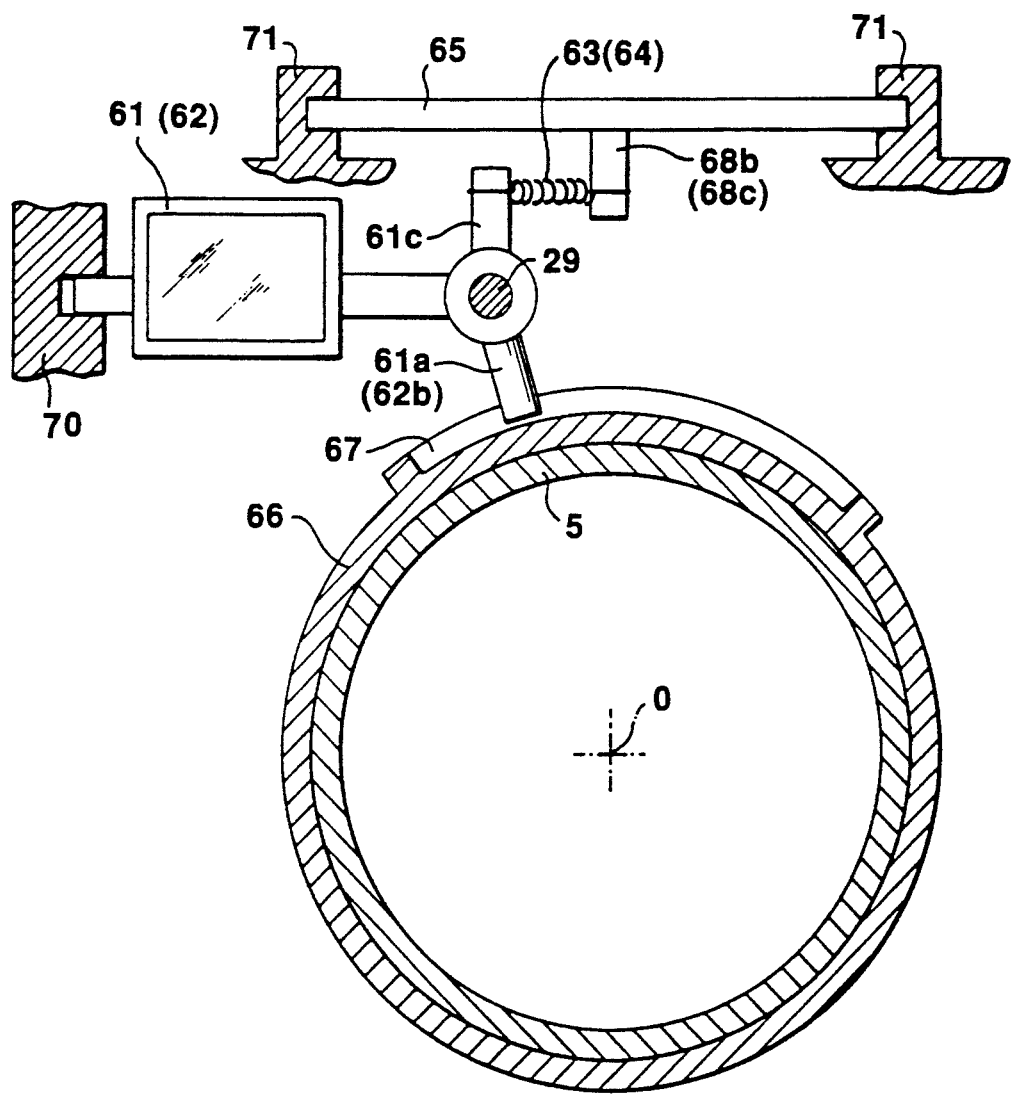
FIG. 29 is a vertically sectioned view of a finder optical system magnification varying mechanism of a camera showing the fifth embodiment of the present invention.

The above mentioned P/N switching ring 23 must be locked so as not to be carelessly moved except when switching, that is, except when the photographing lens is housed. Such locking mechanism shall be explained. As shown in FIG. 28, the P/N switching ring 23 is non-rotatably fitted to the camera body in a position on the outer periphery of the finder cam 24. PN photographing mode holes 23a and 23b are provided on the ring periphery. The engaging pawl 58b of the P/N switching lever 58 pivoted to the shaft 57 on the camera body is energized by the spring 27 and can be engaged with these holes 23a and 23b. Further, the P/N switching pin 28 is provided on the cam ring 56. A contact surface 58a contacted by the above mentioned pin 28 when the photographing lens is housed is formed on the P/N switching lever 58 so that, when the photographing lens reaches the housing position, the pawl 58b of the lever 58 will be pushed up by the pin 28 and will be disengaged from the hole 23a or 23b on the P/N switching ring 23.

When the photographing lens is payed out, the pin 28 will not reach the contact surface 58a of the lever 58 and the pawl 58b will remain engaged with either of the holes 23a and 23b. In this state, the P/N switching ring 23 will remain locked. When the photographing lens reaches the housing position, the pin 28 will kick the P/N switching lever 58 to rotate CW, therefore the pawl 58b will be disengaged from the holes 23b and 23a, the ring will become unable to rotate and the P/N photographing mode will become able to be switched.

The camera showing the fifth embodiment of the present invention shall be explained in the following with reference to FIGS. 29 to 33.

The camera of this embodiment is the same as the camera shown in FIG. 1 in the main formation but is different in the finder magnification varying mechanism switching structure. As shown in .FIG. 29, in the above mentioned finder magnification varying mechanism of the camera of this embodiment, cam pins 61a and 62b of F frames 61 and 62 holding a finder lens contact the cam surface of a finder cam 67 integrally provided on a cam ring 66 and the F frames 61 and 62 are driven as operatively connected with the zooming of the photographing lens. Further, in the case of switching the N photographing mode and P photographing mode, the cam surface on the finder cam 67 contacted by the cam pins 61a and 62a will be switched.

Figure 30:
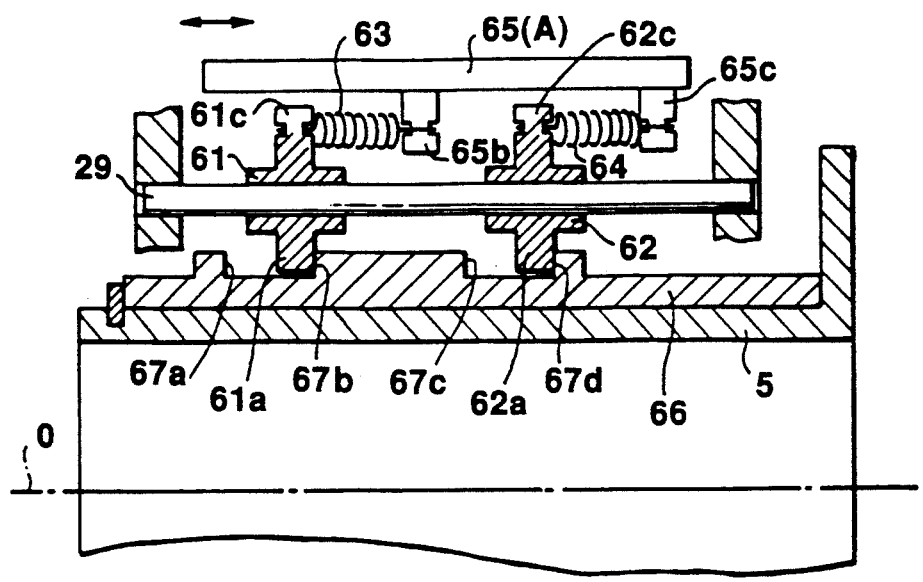
FIG. 30 is a longitudinally sectioned view of the finder optical system magnification varying mechanism in the N photographing mode in the above mentioned FIG. 29.

As shown in FIG. 30, the cam pins 61a and 62a and spring hangers 61c and 62c are integrally formed in the F frames 61 and 62 which are held slidably in the optical axial direction by the sliding guide shaft 29 and supporting part 70 to enable the finder lens to linearly advance and move substantially in the optical axial direction. The sliding plate 65 is supported by the holding part 71 so as to be able to straight advance substantially in the photographing lens optical axial direction 0. By the way, the sliding plate 65 is operatively connected with the N photographing mode and P photographing mode switching mechanism not illustrated and can move between the N photographing position 65 (A) shown in FIG. 31 and the P photographing position 65 (B) shown in FIG. 33.

Figure 31:
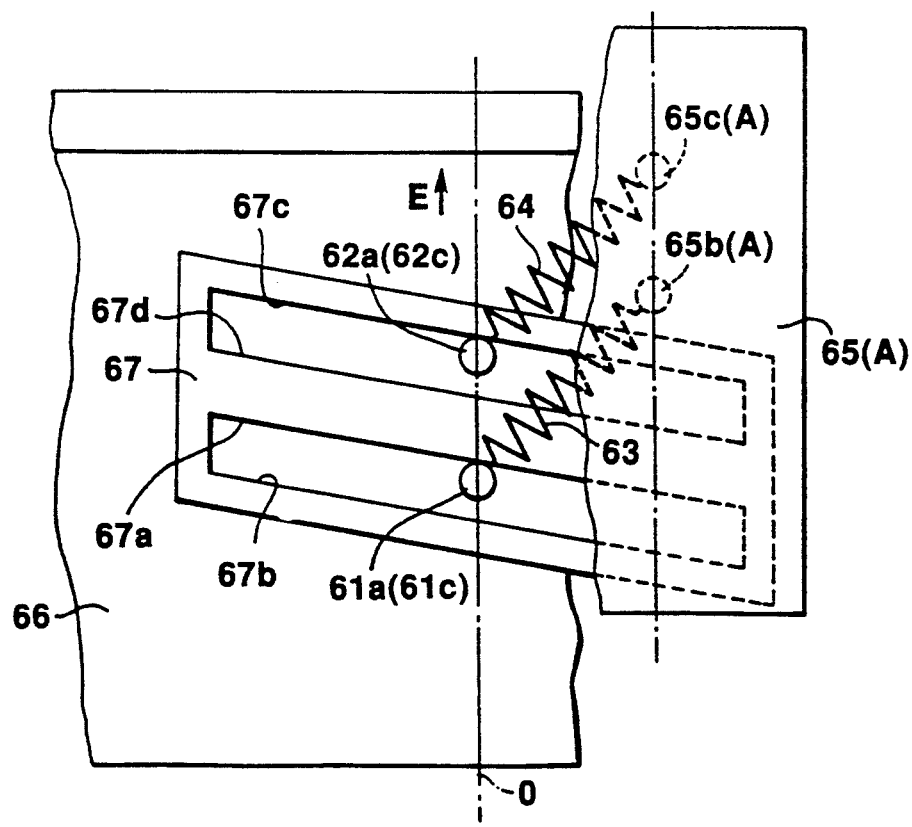
FIG. 31 is a developed view of the finder optical system magnification varying mechanism in the N photographing mode in the above mentioned FIG. 29.

Spring hangers 65b and 65c are integrally formed on the sliding plate 65. As shown in FIGS. 30 and 31, springs 63 and 64 are hung respectively between the spring hangers 61c and 62c of the F frame and the spring hangers 65b and 65c of the sliding plate 65. When the sliding plate 65 is in the N photographing position 65 (A), the spring hangers will be in the positions of 65b (A) and 65c (A), the F frames 61 and 62 will be energized in the direction E in FIG. 31 and the cam pins 61a and 62a will contact the finder cams 67a and 67c of the first region which is a cam surface for the N photographing mode.

Figure 32:
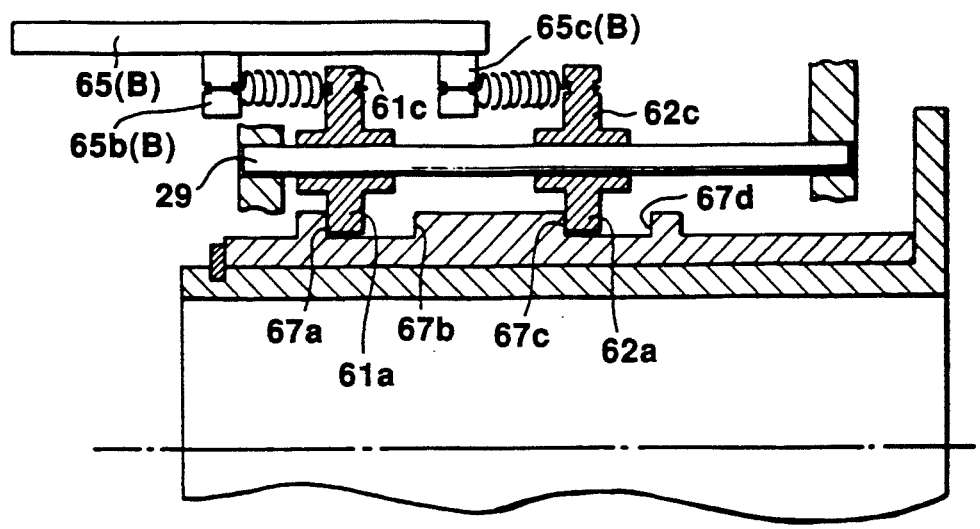
FIG. 32 is a longitudinally sectioned view of the finder optical system magnification varying mechanism in the P photographing mode in the above mentioned FIG. 29.
Figure 33:
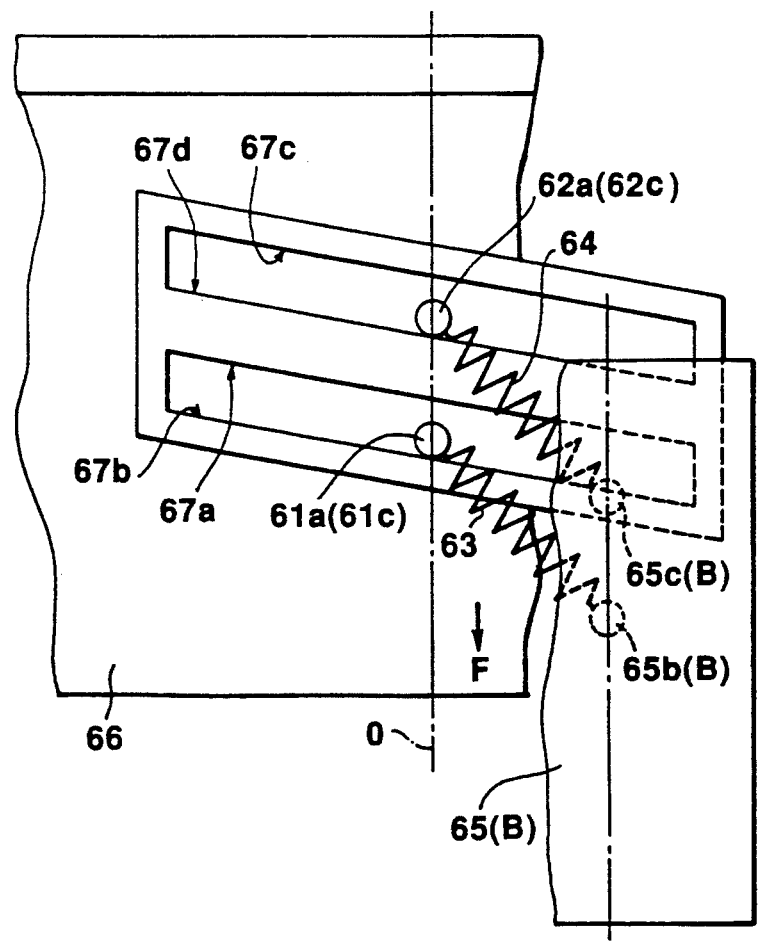
FIG. 33 is a developed view of the finder optical system magnification varying mechanism in the P photographing mode in the above mentioned FIG. 29.

When the mode switching mechanism not illustrated is switched to the P photographing mode, the sliding plate 65 will move to the P photographing mode position 65 (B) in FIGS. 32 and 33, the sliding plate spring hangers will be in the positions of 65b (B) and 65c (B), the F frames 61 and 62 will be energized in the direction F by the forces of the springs 63 and 64, the cam pins 61a and 62a will contact the finder cam surfaces 67b and 67d of the second region which is for the P photographing mode and thus the finder cam will be switched from the N photographing mode cam surface to the P photographing mode cam surface.

As in the above, in the finder magnification varying mechanism of the camera of this embodiment, the F frames 61 and 62 will slide in contact with the cam surfaces on the respective photographing mode sides and the operation of switching the finder magnification variation as operatively connected with the respective mode switchings will be made possible.

The camera showing the sixth embodiment of the present invention shall be explained in the following.

Figure 34:
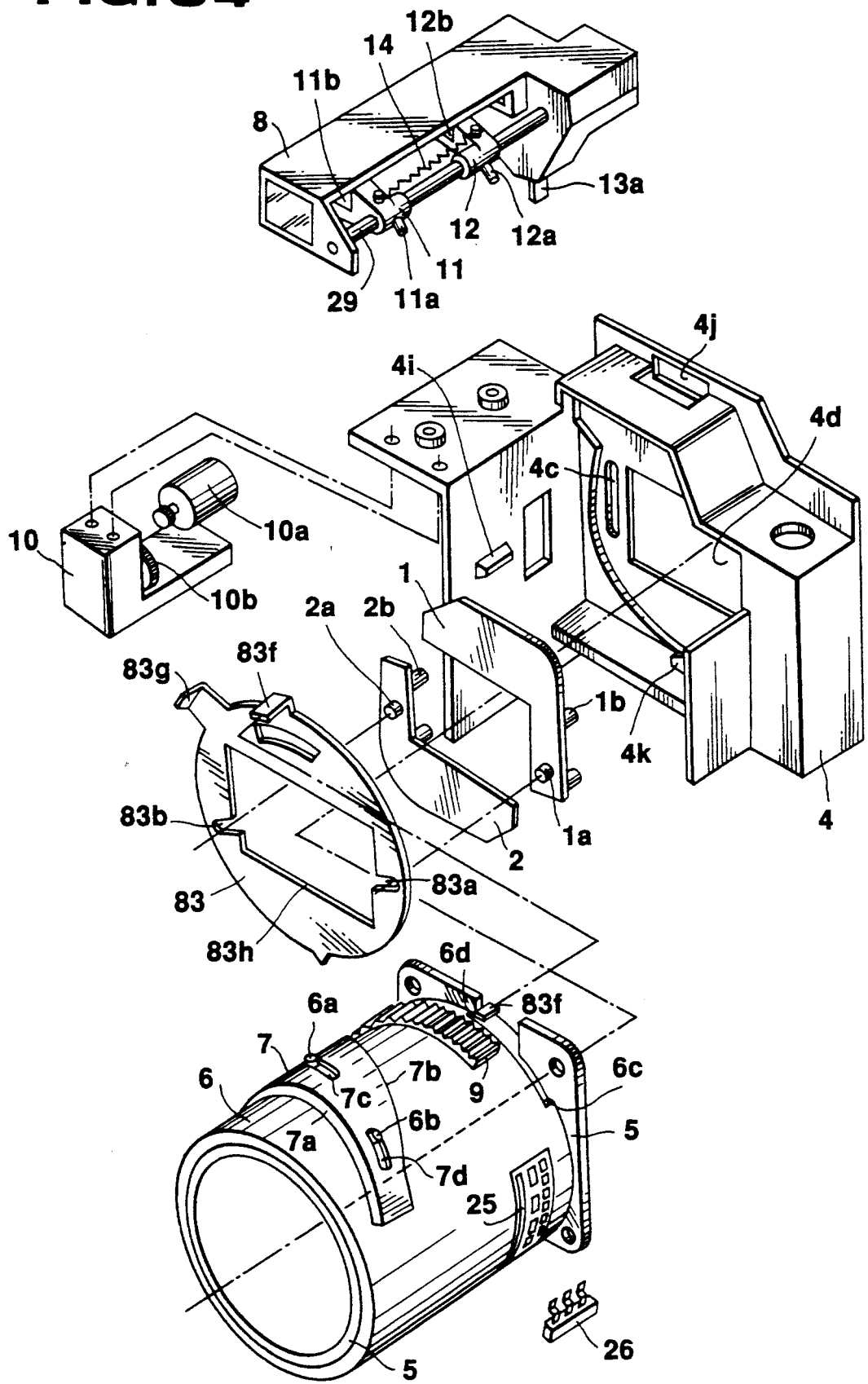
FIG. 34 is an exploded perspective view of a camera showing the sixth embodiment of the present invention.

FIG. 34 is an exploded perspective view of the camera of this embodiment. This camera is formed mostly of a camera body 4, a lens barrel part, a finder unit, a zooming motor unit 10 and a photographed picture size switching mechanism part. By the way, in the case of this camera, too, the full size picture in the N photographing can be switched to a panorama size picture in the P photographing. In this camera, the photographed picture size can be switched by a zooming motor 10a to be a driving source. The same mechanism as of the camera of the above mentioned first embodiment except the photographed picture size switching driving part is to be used and therefore the following explanation shall be made mostly on the parts different from those of the first embodiment. The same components as in the first embodiment shall bear the same reference numerals in the explanation.

The zooming motor unit 10 drives the cam ring 6 for zooming and switches the photographed picture size through the P ring 83. The lens barrel part driven by the cam ring 6 is formed of not only the cam ring 6 but also the fixed frame 5 into which the cam ring 6 is fitted and photographing lenses not illustrated. The same finder cam 7 as in the first embodiment is arranged rotatably in the peripheral direction on the outer periphery of the above mentioned cam ring 6. The gear 9 meshing with the above mentioned gear train 10b is secured to the cam ring 6. Further, the contact surfaces 6c and 6d contactable with the operating arm 83f of the later described P ring 83 are provided in the outer peripheral end part of the cam ring 6. The flexible substrate 25 of the encoder pattern with which the contact piece 26 slides in contact is arranged on the outer periphery of the cam ring 6. The finder unit and photographed picture size switching mechanism part has the same formation as in the first embodiment.

The contact surfaces 6c and 6d of the cam ring 6 can press the operating arm 83f of the P ring 83 and therefore the P ring 83 can be rotated to a predetermined position by the cam ring 6. By this rotation, the masks 1 and 2 fitting in the incised grooves 83a and 83b provided on the inner periphery can be moved to the positions giving the respective picture sizes through the driving pins 1a and 2a. The driving arm 83g of the P ring 83 can contact the driving arm 13a of the visual field mask switching lever 13 of the above mentioned finder unit and, with the rotation of the P ring 83, the switching lever 13 is rotated.

The summary of the operation of the above mentioned camera formed as in the above shall be explained. First of all, in the zooming operation of the camera, the cam ring 6 is rotated by the zooming motor 10a on the basis of a zooming controlling signal and the zooming operation is made. On the basis of the zooming operation, the F frames 11 and 12 of the finder unit are driven in the axial direction by the finder cam 7 to zoom the finder image.

The photographed picture size is switched by rotating the P ring 83 through the contact surfaces 6c and 6d of the cam ring 6 by the above mentioned zooming motor 10a. In switching the N photographing mode, the P ring 83 is rotated counter-clockwise (called CCW hereinafter) to vertically open the masks 1 and 2 to be an image forming part opening corresponding to the N size. In switching the P photographing mode, the P ring 83 is rotated clockwise (called CW hereinafter) to move the masks A1 and B2 to approach each other to be an image forming part opening corresponding to the P size. As operatively connected with the switching operation, the driving arm 83g presses the operating arm 13a of the visual field mask switching lever 13 of the above mentioned finder unit to operate the finder visual field frame switching mechanism and gives a finder visual field frame corresponding to the above mentioned photographed picture size.

Further, the relative positions of the cam ring 6 and finder cam 7 are also switched in response to switching the above mentioned photographed picture the same as in the first embodiment. That is to say, when the cam ring 6 is rotated CCW/CW, the stoppers 4i and 4k will contact the finder cam 7 and, when it is further rotated, the relative positions of the cam ring 6 and finder cam 7 will vary.

The picture size switching mechanism part of this camera shall be explained in detail in the following with reference to FIGS. 35 to 38.

Figure 35:
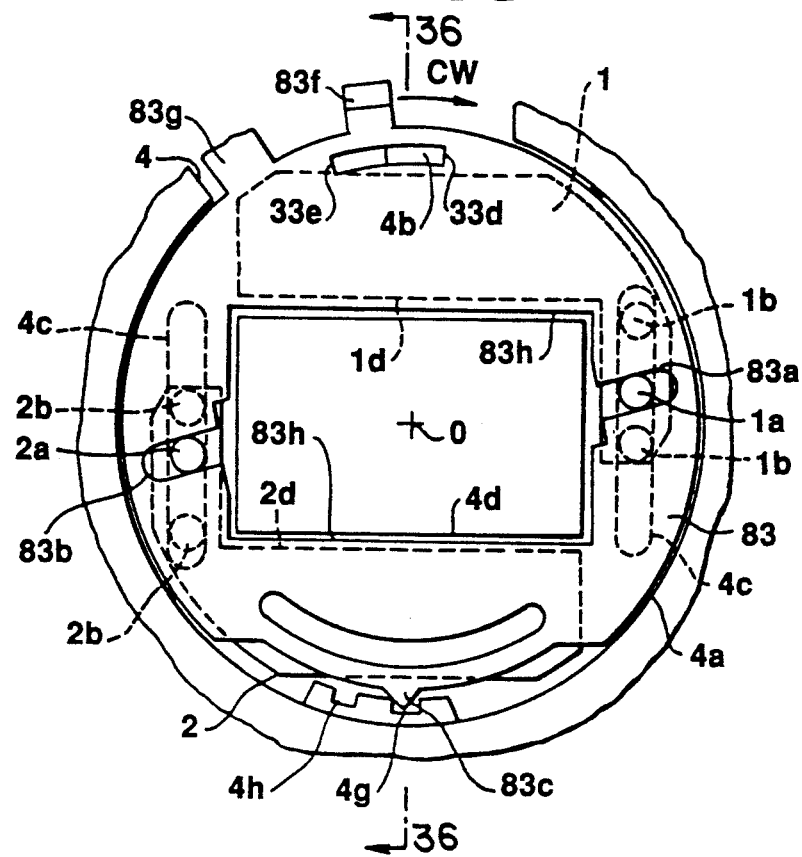
FIG. 35 is an elevation of the picture size switching mechanism part in the N photographing mode of the camera in FIG. 34.
Figure 36:
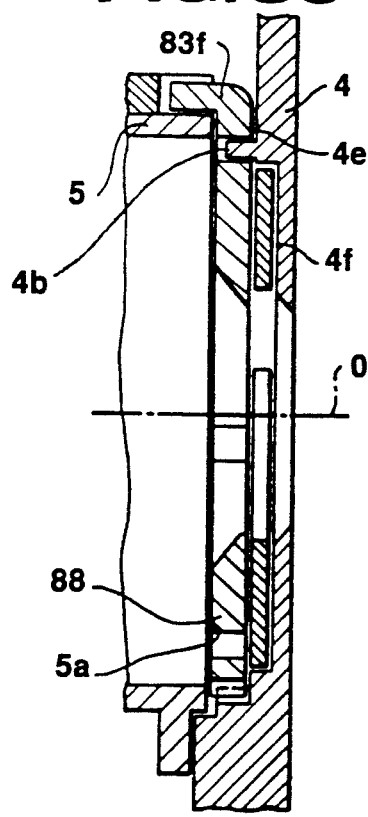
FIG. 36 is a sectioned view on line 36—36 in the above mentioned FIG. 35.
Figure 37:
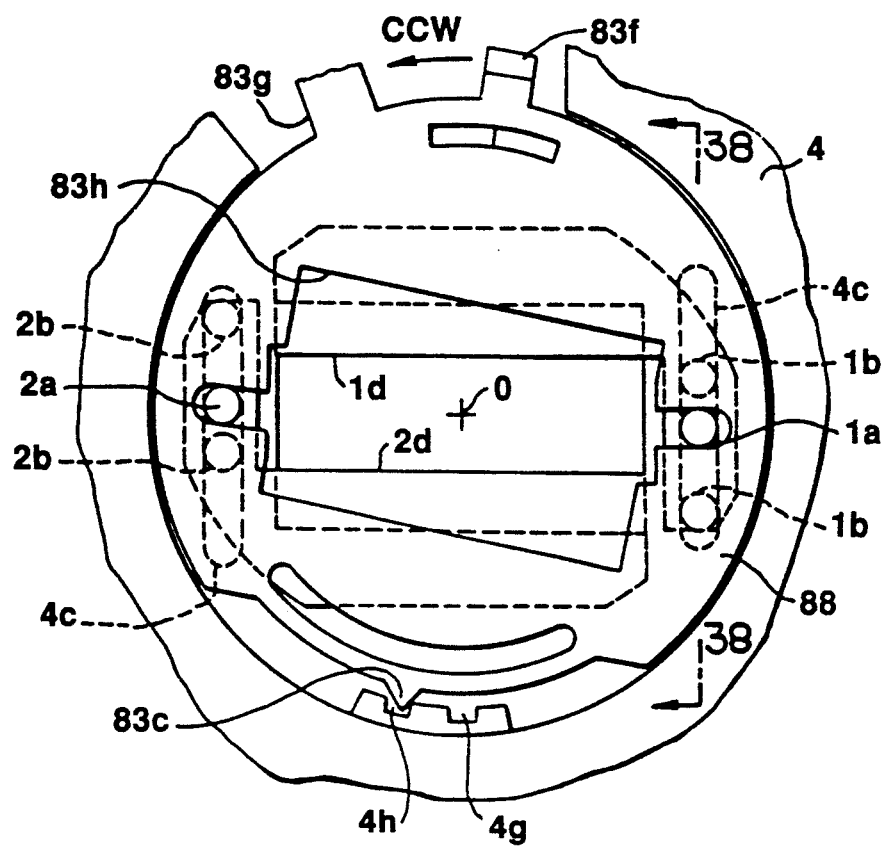
FIG. 37 is an elevation of the picture size switching mechanism part in the P photographing mode of the camera in FIG. 34.

FIG. 35 is an elevation of the picture size switching mechanism part in the N photographing mode as seen from the photographed object side. FIG. 36 is a sectioned view on line 36—36 in the above mentioned FIG.

Figure 38:
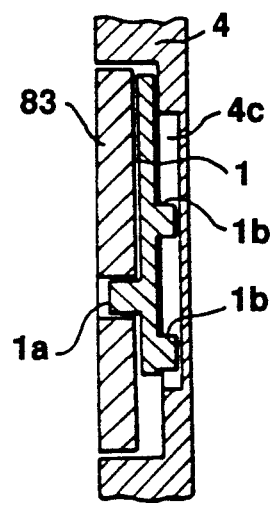
FIG. 38 is a sectioned view on line 38—38 in the above mentioned FIG. 37.

35. FIG. 38 is a sectioned view on line 38—38 in FIG. 37.

The above mentioned picture size switching mechanism part is arranged between the surface 4f of the mask part 4d of the camera body 4 and the end surface 5a of the fixed frame 5 the same as in the first embodiment. The above mentioned switching mechanism is formed of the masks 1 and 2 determining the real photographed picture size in the P photographing, the P ring 83 switching the mask position and the opening 4d of the body 4 giving the N size of the real picture in the N photographing. The P ring 83 and masks A1 and B2 are regulated in the axial direction by the end surface 5a of the fixed frame 5 and the P ring receiving surface 4e of the body 4. The P ring 83 is held non-rotatably by the outer peripheral receiving part 4a. The P ring 83 is rotated and driven by pressing its operating arm 83f with the contact part 6c or 6d of the cam ring 6 (See FIG. 34).

The masks 1 and 2 have moving guiding pins 1b ; and 2b fitted in the straight advance guiding grooves 4c. The driving pins 1a and 2a provided on those masks fit in the incised grooves 83a and 83b of the P ring 83. Further, the P ring 83 has contacts 83e and 83d so that the stopper 4b of the body 4 may contact their contact surfaces to determine the N photographing position and P photographing position. The clicking projection 83c of the P ring 83 fits in the clicking groove 4g or 4h of the body 4 to be positioned by having a clicking holding force. By the way, the operation of this picture size switching mechanism is the same as in the first embodiment.

The switching position relation of the finder cam 7 and P ring 83 shall be explained in the following with reference to the operating state developed view of the cam ring 6, P ring 83 and finder cam 7. By the way, in FIG. 39, the line FL represents the operating line of the cam pins 11a and 12a of the finder.

Figure 39:
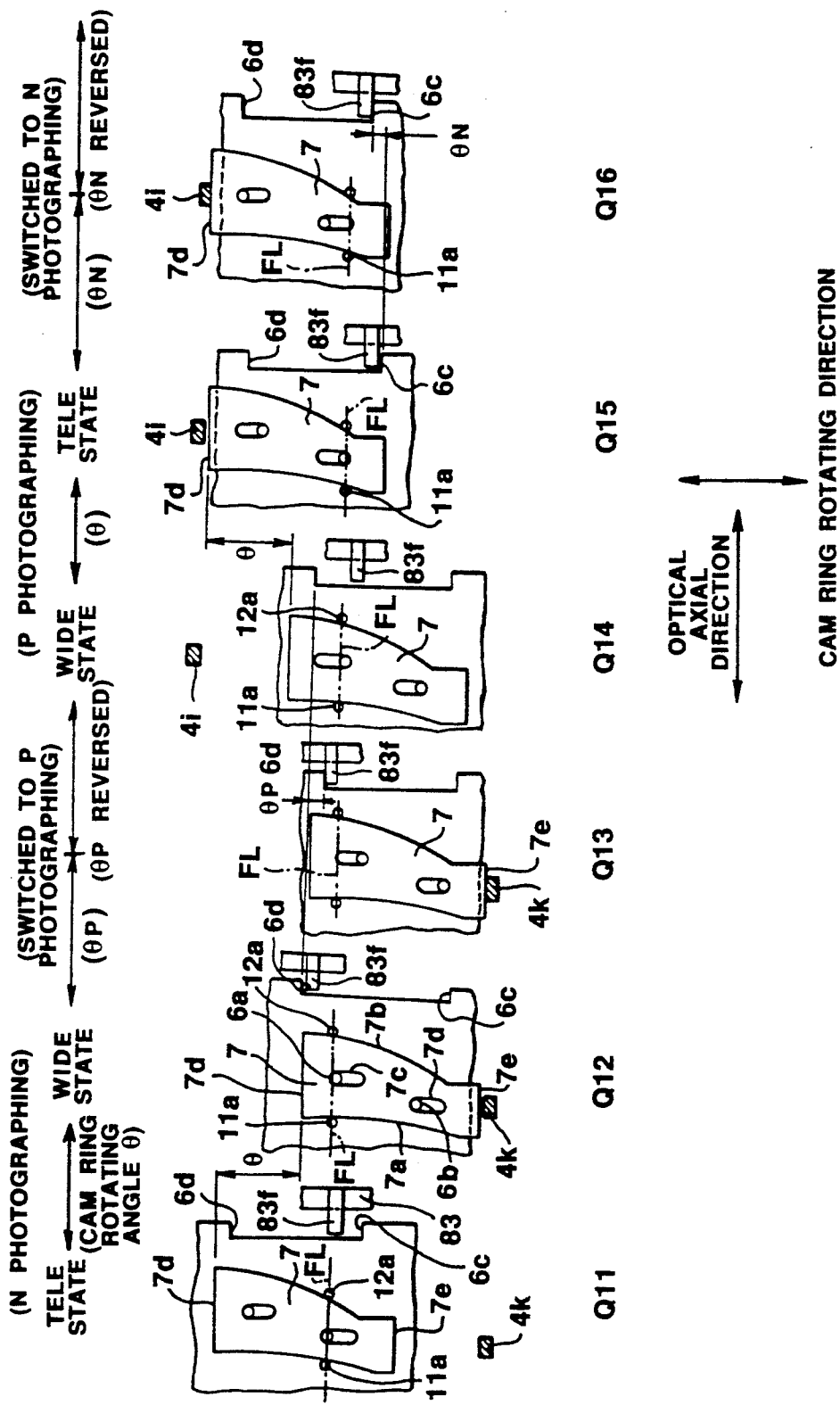
FIG. 39 is a developed operation view of a cam ring and finder cam as switched to the N/P photographing mode of the camera in the above mentioned FIG. 34.

In FIG. 39, the states Q11 to Q12 represent the N photographing mode state, the state Q 11 is a zooming tele state and Q 12 is a wide state. In such case, the focal length is altered by driving the cam ring 6 within the range of an angle θ to obtain any focal length. At this time, the cam pins 11a and 12a of the finder frame will slide along the cam surfaces 7a and 7b and the finder optical system will vary the magnification corresponding to it. As the contact surfaces 6c and 6d of the cam ring 6 do not act on the P ring 83, the N photographing state will remain as it is and the picture will be held to be of the N size.

Therefore, in order to switch the mode to the P photographing mode, the zooming motor 10a is driven, the cam ring 6 is rotated CW by an angle θp and the state Q12 is varied to Q13. By this operation, first, the end surface 7e of the finder cam will contact the body stopper 4k and the relative position to the cam ring 6 of the finder cam 7 will be switched to the P photographing mode position. At the same time, the contact surface 6d of the cam ring 6 will press the operating arm 83f of the P ring 83 and the P ring 83 will rotate to the P photographing mode position. By this operation, the real picture size will be switched to the P size (panorama size). At this time, the switching lever 13 of the visual field mask of the finder unit will be operated through the driving arm 83g by the rotation of the P ring 83 and the finder visual field frame will be switched at the same time to the P photographing visual field frame. Then, the cam ring 6 will be reversely rotated by the angle θp by the zooming motor 10a to make the state Q14 which is a wide state of the P photographing mode.

The states Q14 to Q15 will hold the P photographing mode state, the state Q14 will be a zooming wide state and the state Q15 will be a tele state. In such case, too, the focal length will be altered by driving the cam ring 6 within the range of an angle θ to obtain any focal length. Also the cam pins 11a and 12a of the finder frame slide along the cam surfaces 7a and 7b and the finder optical system varies the magnification corresponding to it. However, in this P photographing state, as shown in the above mentioned FIG. 14, the magnification will take a value larger than in the case of the N photographing. By the way, in this section, the incised contact surfaces 6c and 6d of the cam ring 6 will not act on the P ring 83 and therefore the picture size will not vary.

Further, in order to return the N photographing mode, as shown in FIG. 39, the cam ring 6 is rotated by an angle θN by the zooming motor 10a to vary the state Q15 to the state Q16. By this operation, first, the end surface 7d of the finder cam will contact the body stopper 4i and the relative position with the cam ring 6 of the finder cam 7 will be switched to the N photographing mode position. At the same time, the contact surface 6c of the cam ring 6 will press the E operating arm 83f of the P ring 83, the P ring 83 will be rotated to the N photographing mode position and the real picture size will be switched to the N size. At this time, the visual field switching lever 13 of the finder unit will be operated through the driving arm 83g by the rotation of the P ring 83 and the finder visual field frame will be switched at the same time to the N photographing visual field frame. Then, when the cam ring 6 is reversely rotated by the angle θN, the tele state of the N photographing mode of the state Q1 will be returned.

In the above mentioned explanation, the photographing mode is switched from the state Q12 or Q15 but the mode can be switched also from any focal length state. In such case, the P ring 83 will be rotated by a predetermined angle, the mode will be switched and then the cam ring 6 may be returned again to the original focal length position.

As in the above, in this embodiment, by rotating the cam ring 6 by an angle θp or θN over the normally used region, that is, over the wide or tele region by the zooming motor 10a, the finder magnification, real picture size and visual field frame can be switched as operatively connected.

The picture size switching mechanism controlling circuit of the camera of this embodiment shall be explained in the following.

Figure 40:
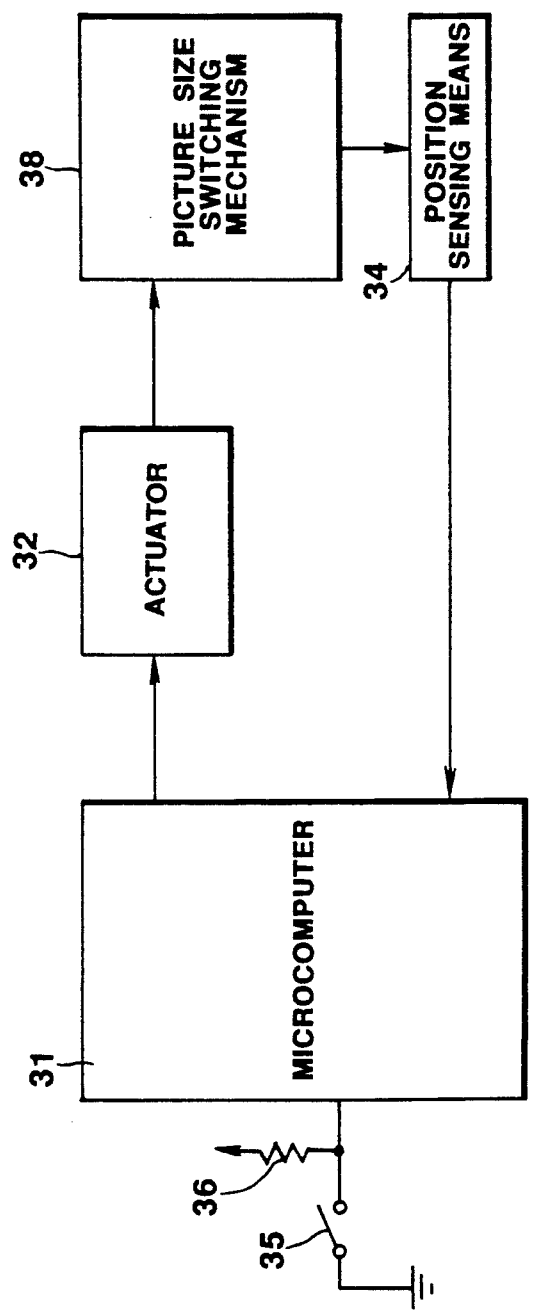
FIG. 40 is a main block formation view of a picture size switching mechanism controlling circuit of the camera in the above mentioned FIG. 34.

FIG. 40 is a main block formation view of the above mentioned controlling circuit. This circuit is formed of a micro-computer 31, an actuator 32, a picture size switching mechanism 38, a position detecting means 34, a picture size switching instructing switch 35 and a pull-up resistance 36. By the way, the zooming motor 10a of the driving source shown in FIG. 34 corresponds to the above mentioned actuator 32. Such real picture size switching mechanism as the P ring 83 driven through the cam ring 6 shown in FIG. 34 or 35 corresponds to the picture size switching mechanism 38. The flexible substrate 25 and contact piece 26 of the encoder pattern shown in FIG. 34 correspond to the position detecting means which detects the rotating angle of the cam ring 6 and therefore the operating position of the picture size switching mechanism. The instructing switch 35 is operatively connected to an appearance part operating member of the camera not illustrated and is to select and instruct either of the N and P photographing modes. The pull-up resistance 36 will give a high level signal to the micro-computer 31 when the switch 35 is off. On the basis of this switch 35 being switched on from off, the micro-computer 31 starts the above mentioned actuator 32.

Figure 41:
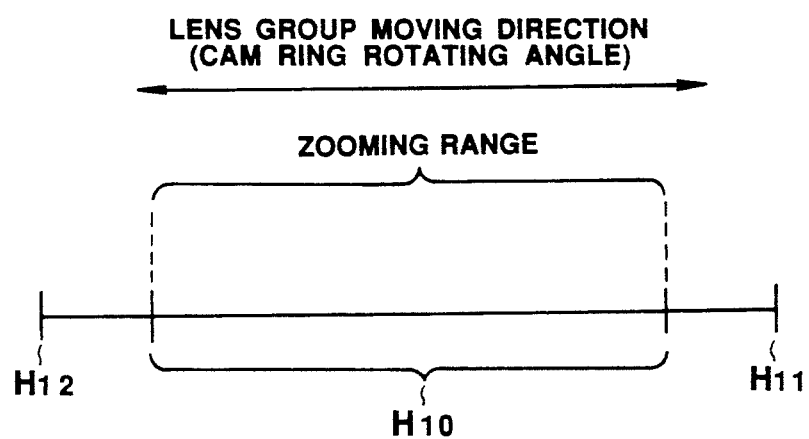
FIG. 41 is a view showing a cam ring operating rotating position in the picture size switching control of the camera in the above mentioned FIG. 34.

FIG. 41 is a diagram for explaining the photographing lens moving position or the cam ring rotating position against the operating state. The abscissa of this diagram represents the photographing lens moving position or the cam ring rotating angle. The region H10 in the central part represents a zooming area between the wide and tele states where the photographing lens is payed out. If the photographing lens is moved to the switching position H11 (corresponding to the rotating angle θN in FIG. 39) and is returned again to the region H10, the photographing lens will be switched to the N photographing mode where the picture size is the N size (full size). In the same manner, if the photographing lens is moved from the region H10 to the switching position H12 (corresponding to the rotating angle θp in FIG. 39) and is returned again to the region H10, the lens will be switched to the P photographing mode where the picture size is the P size (panorama size).

Figure 42:
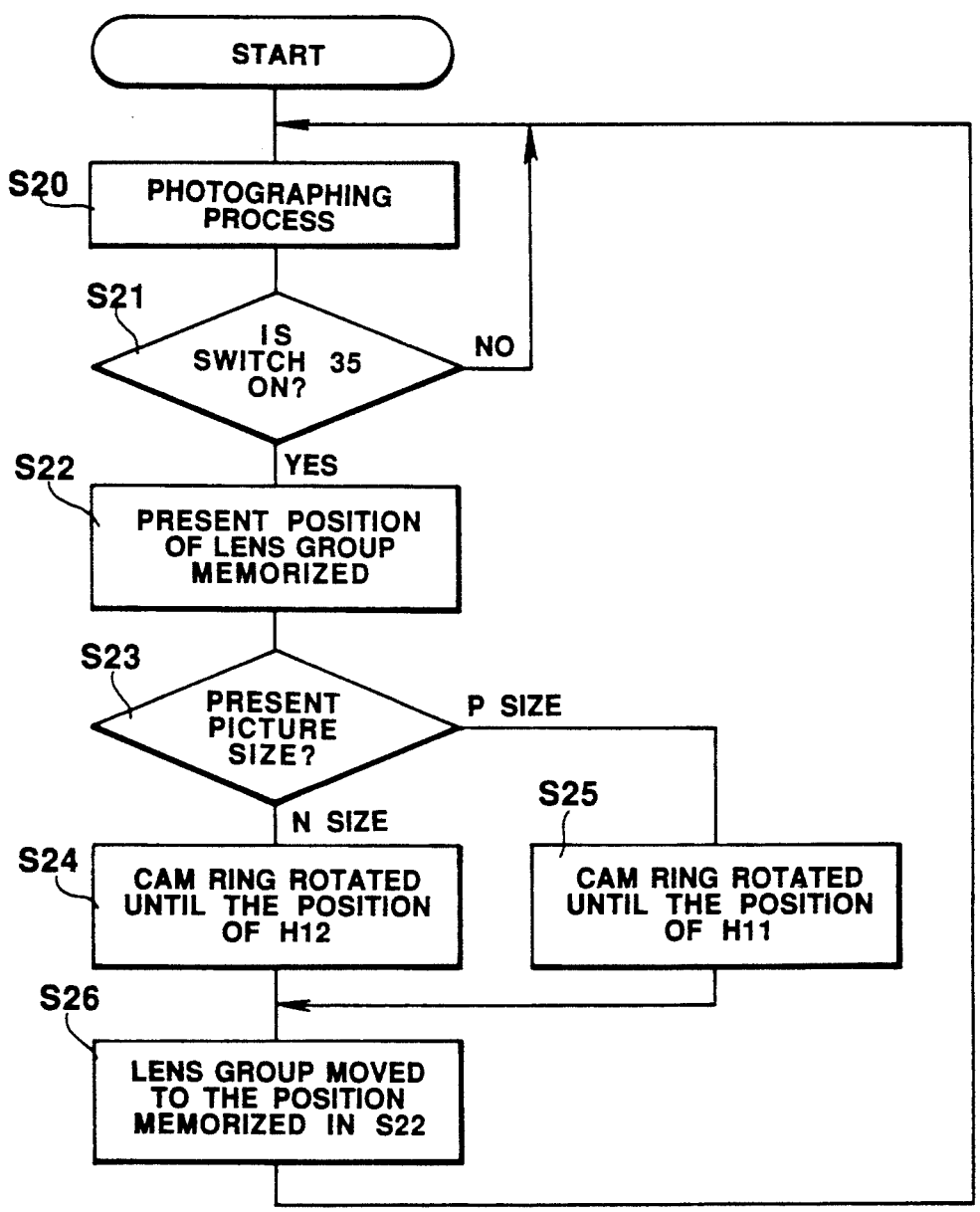
FIG. 42 is a flow chart of a picture size switching controlling process of the camera in the above mentioned FIG. 34.
Figure 43:
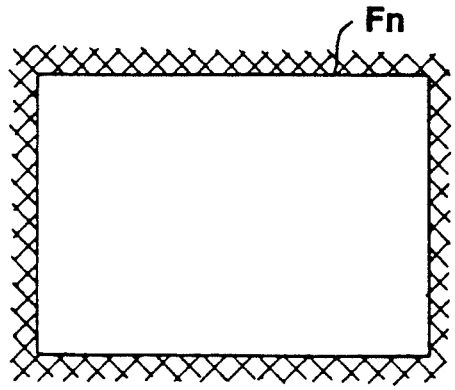
FIG. 43 is a view showing a finder visual field frame at the time of the normal photographing of a camera of the related art.

The processing operation of this controlling circuit shall be explained in the following with reference to the flow chart in FIG. 42 by using the above mentioned FIG. 41.

First of all, after the power source is set, the photographing process is repeated by the loop from the step S20 to the step S21. In the above mentioned step S 21, in case the output of the N/P photographing mode switching instructing switch 35 is detected to be on, the process will jump to the step S22. In the step S22, the position data of the present photographing lens group are detected by the position detecting means 34 and are memorized in the memory of the micro-computer 31 and the process proceeds to the step 23. In the step S23, the present set picture size is read out of the memory and is judged. If it is the N size, the process will proceed to the step S24. If it is the P size, the process will jump to the step S25.

In the step S24, the cam ring 6 is rotated to the position of H12 in FIG. 41 and the real picture size is switched to the P size by the picture size switching mechanism. Then, at the same time, the finder visual field frame is also switched to the visual field frame corresponding to the P photographing mode. Further, the finder cam 7 is also varied in the relative position to the cam ring 6 and the finder magnification characteristic adapted to the P photographing is set. Then, the process proceeds to the step S26.

In the step S25, the cam ring 6 is rotated to the position of H11 in FIG. 41 and the real picture size is switched to the N size by the picture size switching mechanism. Then, at the same time, the finder visual field frame is also switched to the visual field frame corresponding to the N photographing mode. Further, the finder cam 7 is also varied in the relative position to the cam ring 6 and the finder magnification characteristic adapted to the N photographing is set. These switching operations are as already explained.

Then, in the same manner, the process proceeds to the step S26. Then, in the step S26, the photographing lens group is returned to the position memorized in the step S22, the picture size switching operation ends and the process returns to the photographing process in the step S22.

Thus, according to the camera of this embodiment, if only the picture size switching instruction is given, the desired photographed picture size will be able to be immediately switched. Also, as the position of the photographing lens at the time of switching is memorized as described above, immediately after the switching ends, the zooming position before the switching can be returned. Thus the camera is very handy to use. By the way, the ,camera of this embodiment can be applied to not only the cameras of the above explained respective embodiments but also the tele/wide two-focus switching cameras and optical finder fitted electronic cameras.

What is claimed is:

1. A camera comprising:
   a photographing optical system capable of linearly changing its focal distance;
   rotary actuator means for changing the focal distance of said photographing optical system;
   a finder optical system capable of linearly changing its view field magnification;
   frame size switching means for switching a picture frame size between an ordinary frame size and a panoramic frame size which is obtained by modifying upper and lower parts of a picture frame of said ordinary size; and
   finder optical system actuating means for actuating said finder optical system in such a manner that the view field magnification is changed over a first linear magnification range responsive to selection of the ordinary frame size and is changed over a second linear magnification range different from the first linear magnification rang responsive to selection of the panoramic frame size.

2. A camera according to claim 1 wherein said finder optical system actuating means includes a cam plate movable relative to said rotary actuator means between a fist position and a second position on said rotary actuator means for changing the magnification range of said finder optical system.

3. A camera according to claim 2 wherein said cam plate is movable between said first and second positions responsive to operation of said frame size switching means.

4. A camera according to claim 2 wherein said cam plate is movable between said first and second positions responsive to rotation of said rotary actuator means.

5. A camera according to claim 1 wherein operation of said frame size switching means causes said rotary actuator means to change the focal distance of said photographing optical system to rotate through a predetermined angle of rotation.

6. A camera according to claim 2 wherein one of said cam plate and rotary actuator means is provided with guide slots and the other one of said cam plate and said rotary actuator means is provided with guide pins extending into said guide slots to provide limited slidable movement of said cam plate along said rotary actuator means relative to the rotary actuator means.

7. A camera according to claim 6 wherein opposing ends of said guide slots abut said guide pins to respectively define said first and second positions.

8. A camera according to claim 2 further comprising stopper means arranged in a path of movement of said cam plate and engaging respective ends of said cam plate for moving said cam plate between said first and second positions upon selective rotation of said rotary actuator means in one of a clockwise and a counterclockwise direction.

9. A camera comprising:
a photographing optical system which is movable to linearly change its focal distance;
rotary actuator means being rotatable to actuate said photographing optical system, said rotary actuator means having a first region of rotation and a second region of rotation beyond said first region, for effecting changes in said focal distance;
a finder optical system which is movable to linearly change its view field magnification;
finder optical system actuator means for actuating said finder optical system, said finder optical system actuator means being arranged on said rotary actuator means for actuating said photographing optical system for movement between a first position and a second position, said finder optical system actuating means actuating said finder optical system in accordance with rotation of said rotary actuating means in such a manner as to change a view field magnification over a first magnification range when it is in said first position and to change the view field magnification over a second magnification range when it is in said second position;
frame size switching means for switching a size of a picture frame between a first size and a second size different from said fist size; and
view field magnification changing means for moving said finder optical system actuator means between said first position and said second position in accordance with rotation of the rotary actuator means between said first and second regions of rotation.

10. A camera according to claim 9 wherein said frame size switching means switches the picture frame size between said first size which is an ordinary frame size and said second size which is a panoramic frame size which is obtained by introducing first and second masks to associated first and second parts of a frame of said ordinary frame size.

11. A camera according to claim 9 wherein said finder optical system actuating means includes a cam plate rotatable with rotation of said rotary actuator means for actuating said photographing optical system and having a cam surface for actuating said finder optical system.

12. A camera according to claim 11 wherein said cam plate is movable relative to said rotary actuator means between said first and second positions responsive to stopper means provided on a stationary part of said camera adjacent said rotary actuator means and abutting and moving sad cam plate when said rotary actuator means for actuating said photographing optical system has been rotated to said second region of rotation.

13. A camera switchable between an ordinary photographing mode which provides an ordinary picture frame size and a panoramic photographing mode which provides a panoramic picture frame size, comprising:
a magnification changeable photographing optical system;
a photographing optical system actuator member rotatable about the photographing optical system to change the magnification of said photographing optical system;
a finder optical system having an optical axis different from that of said photographing optical system and capable of changing its magnification at a magnification changing ratio greater than that of said photographing optical system; and
a cam member provided on said actuator member for actuating said finder optical system to change the magnification of said finder optical system in accordance with the movement of said actuator member, said cam member having a first region and a second region formed thereon, said first region operable to actuate said finder optical system to change the magnification of said finder optical system over a first magnification range in accordance with the magnification changing operation of said photographing optical system in said ordinary photographing mode, said second region partly overlapping and continuous from said first region and operable to actuate said finder optical system to change the magnification of said finder optical system over a second magnification range different from said first magnification range in accordance with the magnification changing operation of said photographing optical system to said panoramic photographing mode.

14. A camera according to claim 13 wherein said first and second magnification ranges partially overlap one another.

15. A camera according to claim 13 wherein said cam member is rotatable with rotation of said actuator member, and is movable in accordance with the photographing mode switching operation between a position where said first region is used for actuation and a position where said second region is used for actuation.

16. A camera switchable between an ordinary photographing mode which provides an ordinary picture frame size and a panoramic photographing mode which provides a panoramic picture frame size, comprising:
a magnification changeable photographing optical system of said photographing system;
a photographing optical system actuator member rotatable about the optical system to actuate said photographing optical system;
a finder optical system having an optical axis different from that of said photographing optical system and capable of changing its magnification at a magnification changing ratio greater than that of said photographing optical system; and
a cam member provided on said actuator member for changing the magnification of said finder optical system responsive to rotation of said actuator member, said cam member having a first cam region and a second cam region, said first cam region operable to actuate said finder optical system to change magnification of said finder optical system over a first magnification range in accordance with a magnification changing operation of said photographing optical system in said ordinary photographing mode, said second cam region partially overlapping and substantially continuous with said first cam region and operable to actuate said finder optical system to change magnification of said finder optical system over a second magnification range different from said first magnification range in accordance with a magnification changing operation of said photographing optical system in said panoramic photographing mode, in such a manner that the subject is viewed in the view finder at a greater magnification when said second cam region is used for controlling actuation than when said first cam region is used for actuation.

17. A camera according to claim 16 wherein said cam member is movable relative to said actuator member by a predetermined amount in accordance with switching of said ordinary photographing mode and said panoramic photographing mode.

18. A camera according to claim 17 further comprising slide means having follower means engaging said cam member for changing magnification of said finder optical system responsive to rotation of said actuator member; selection mans rotatable about said actuating member for moving said slide means in one of two circumferential directions along said actuator member for selection of a frame size whereby said follower means moves along different portions of the cam plate according to the direction of movement of said selection means.

19. A camera according to claim 18 wherein said selection means comprises an annular member surrounding said actuator member and having a guide slot receiving and guiding said slide means to move along a path substantially parallel to said optical axis.

20. A camera according to claim 19 wherein said cam means has a pair of cam surfaces;
said slide means comprising a pair of slides;
said follower means each comprising a follower pin engaging one of said cam surfaces;
spring means coupled to said follower pins for urging said follower pins into sliding engagement with their associated cam surfaces;
said finder optical system having at least first and second movable lenses; and
means engaging said slides for respectively moving said first and second movable lenses.

21. A camera according to claim 16 wherein said cam member is provided with first and second cam surfaces;
said finder optical system having at least on movable lens;
follower means selectively engaging one of said first and second cam surfaces for respectively controlling movement of said lens; and
annular-shaped selection means rotatable about said actuator member for controlling engagement of said follower means with one of said first and second cam surfaces.

22. A camera according to claim 16 wherein said cam member is provided with first and second paris of cam surfaces;
said finder optical system having first and second movable lenses;
first and second follower means each selectively engaging a cam surface of one of said paris of cam surfaces for respectively controlling movement of said first and second lenses; and
annular-shaped selection means rotatable about said actuator member for controlling engagement of said first and second follower means with associated cam surfaces of one of said first and second paris of cam surfaces.

23. A camera according to claim 22 further comprising spring means coupled to said first and second follower means for maintaining said follower means in sliding engagement with the cam surfaces selected by said selection means.

24. A camera according to claim 16 wherein said cam member is provided with first and second cam surfaces;
said finder optical system having at least one movable lens;
follower means selectively engaging one of said cam surfaces for respectively controlling movement of said movable lens; and
selection means movable along a path substantially parallel to an optical axis of said photographing optical system for controlling engagement of said follower means with one of said first and second cam surfaces.

25. A camera according to claim 16 wherein said cam member is provided with first and second pairs of cam surfaces;
said finder optical system having at least first and second movable lenses;
first and second follower means each selectively engaging a cam surface of one of said pairs of cam surfaces for respectively controlling movement of said first and second movable lenses;
selection means movable along a path substantially parallel to an optical axis of said photographing optical system for controlling engagement of said first and second follower means with associated cam surfaces of one of said first and second pairs of cam surfaces.

26. A camera according to claim 25 further comprising spring means coupled to said first and second follower means for maintaining said follower means in sliding engagement with the cam surfaces selected by said selection means.

27. A camera switchable between an ordinary photographing mode which provides an ordinary picture frame size and a panoramic photographing mode which provides a panoramic picture frame size, comprising;
a magnification changeable photographing optical system of said photographing system;
a photographing optical system actuator member rotatable about said optical system for controlling magnification of said photographing optical system;
a finder optical system having an optical axis different from that of said photographing optical system and capable of changing its magnification at a magnification changing ratio greater than that of said photographing optical system;
a finder view frame provided in said finder optical system and changeable responsive to switching of the photographing mode, between a position where it forms a view field corresponding to an ordinary picture frame size and a position where it forms a view field corresponding to a panoramic picture frame size different from said ordinary picture frame size; and
a cam member provided on said actuator member for changing the magnification of said finder optical system responsive to rotation of said actuator member, said cam member being operable in an ordinary photographing mode to actuate said finder optical system to vary magnification of said finder optical system over a first magnification range in accordance with a first magnification changing operation of said photographing optical system, and, in a panoramic photographing mode, operable to actuate said finder optical system to vary magnification of said finder optical system over a second magnification range different from said first magnification range in accordance with a second magnification changing operation of said photographing optical system so as to provide a greater magnification of said finder optical system than that obtained in said ordinary photographing mode.

28. A zoom camera comprising:
a photographic optical system operable for zooming between a telephoto end and a wide end;
a photographing frame size switching means for switching a photographing frame size between a first frame size obtained in a first ordinary photographing mode and a second frame size smaller than said first frame size obtained in a photographing mode different from said first photographing mode;
a finder optical system operable for zooming;
photographing optical system actuator means for actuating said photographing optical system for zooming, said photographing optical system actuator means being movable beyond at least one of a telephoto end and a wide end of said photographing optical system in accordance with operation of said frame size switching means; and
finder optical system actuator means for actuating said finder optical system for zooming, said finder optical system actuator means being operatively connected to said photographing optical system actuator means and said frame size switching means for actuating said finder optical system to assume a state nearer to the telephoto end in accordance with switching of the frame size from said first size to said second size.

29. A camera comprising:
a photographing optical system capable of changing photographing magnification;
rotary actuator means for actuating said photographing optical system to change the photographing magnification;
picture frame size switching means for switching picture frame size between a first frame size which is an ordinary picture frame size and a second picture frame size which is smaller than said first picture frame size;
a finder optical system capable of changing view field magnification; and
view field magnification changing mans for changing magnification of a view field in said finder optical system, said view field magnification changing means being operatively connected to said rotary actuator means and said picture frame size switching means to change magnification of the view field in said finder optical system over a first magnification range in accordance with the magnification changing operation of said photographing optical system and to actuate said finder optical system to assume a greater view field magnification over a second magnification range different from said first magnification range in response to switching from said first picture frame size to said second picture frame size.

30. A camera comprising:
a photographic optical system capable of linearly changing its focal distance;
a finder optical system capable of linearly changing its view field magnification;
picture frame size changing means for changing size of a picture frame; and
view field magnification changing means for changing a magnification range of the view field of said finder optical system in accordance with operation of the frame size changing means.

31. A method for operating a camera comprising a photographing optical system having a changeable focal length and movable between first and second positions, photographing frame size changing means for changing frame size of a picture frame to a first frame size when the photographing optical system is moved to said first position and for changing the picture frame size to a second frame size different from said first frame size when said photographing optical system moves to said second position, said method comprising the steps of:
(a) memorizing a present position of said photographing optical system responsive to a frame changing request;
(b) moving said photographing optical system to one of said first and second positions according to a frame size selected by the frame changing request to operate said photographing frame size changing means; and
(c) returning the photographing optical system to the memorized position preparatory to a photographing operation.

32. A method for operating a camera having a photographing optical system of changeable focal length and movable between first and second positions, a finder optical system having a changeable magnification, a finder frame size changing system for changing frame size of a finder frame to a first size when the photographing optical system is moved to said first position and for changing the finder frame size to a second frame size different from said first frame size when said photographing optical system moves to said second position, said method comprising the steps of:
(a) memorizing a present position of said photographing optical system responsive to a frame changing request;
(b) moving said photographing optical system to one of said first and second positions according to the frame size selected by the finder frame changing request to operate the finder frame size changing means; and
(c) returning the photographing optical system to the memorized position preparatory to a photographing operation.

33. A method for operating a camera comprising a photographing optical system having a changeable focal length and movable between first and second positions, photographing frame size changing means for changing frame size of a picture frame to a first frame size when the photographing optical system is moved to said first position and for changing the picture frame size to a second frame size different from said first frame size when said photographing optical system moves to said second portion;
a finder optical system having a changeable magnification, a finder frame size changing system for changing frame size of a finder frame to a first size when the photographing optical system is moved to said first position and for changing the finder frame size to a second frame size different from said first frame size when said photographing optical system moves to said second position, said method comprising the steps of:
(a) memorizing a present position of said photographing optical system responsive to a frame changing request;
(b) moving said photographing optical system to one of said first and second positions according to a frame size selected by the frame changing request to operate said photographing frame size changing means; and (c) moving said photographing optical system to one of said first and second positions according to the frame size selected by the finder frame changing request to operate the finder frame size changing means; and (d) returning the photographing optical system to the memorized position preparatory to a photographing operation.

* * * * *

UNITED STATES PATENT AND TRADEMARK OFFICE
CERTIFICATE OF CORRECTION

PATENT NO. : 5,325,140
DATED : June 28, 1994
INVENTOR(S) : Yuichi Torikoshi, Goichi Hiratsuka, Hideki Okubo, Takashi Suzuki and Hideaki Kume It is certified that error appears in the above-indentified patent and that said Letters Patent is hereby corrected as shown below:

Column 6, line 65, change "shall e" to --shall be--.
Column 7, line 1, after "finder" insert --frames--.
Column 8, line 5, change "ram" to --mm--.
Column 9, line 14, change "A1" to --1--.
Column 9, line 15, change "B2" to --2--.
Column 18, line 45, change "A1 and B2" to --1 and 2".
Column 19, line 20, before "and" (second occurrence) delete ";".
Column 22, line 11, change "the ,camera" to --the camera--.
Column 23, line 28, of claim 9, change "fist" to --first--.
Column 23, line 6 of claim 12, change "sad" to --said--.
Column 25, lines 2, 7 and 14 of claim 22, change "paris" to --pairs--.

Signed and Sealed this

Sixth Day of June, 1995

*Attest:*

BRUCE LEHMAN

*Attesting Officer*   *Commissioner of Patents and Trademarks*